United States Patent
Classen et al.

(10) Patent No.: US 7,814,214 B2
(45) Date of Patent: Oct. 12, 2010

(54) CONTACT MANAGEMENT IN A SERVERLESS PEER-TO-PEER SYSTEM

(75) Inventors: Andre R. Classen, Bellevue, WA (US); Anirudh Anirudh, Redmond, WA (US); David G. Thaler, Redmond, WA (US); Kevin R. Tao, Kirkland, WA (US); Ravi T. Rao, Redmond, WA (US); Rohit Gupta, Redmond, WA (US); Tomer Weisberg, Bellevue, WA (US); Upshur Warren Parks, III, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/483,507

(22) Filed: Jun. 12, 2009

(65) Prior Publication Data

US 2009/0248868 A1 Oct. 1, 2009

Related U.S. Application Data

(63) Continuation of application No. 11/112,135, filed on Apr. 22, 2005, now Pat. No. 7,571,228.

(51) Int. Cl.
*G06F 15/16* (2006.01)
(52) U.S. Cl. .................. 709/227; 709/229; 709/224; 709/218; 370/401
(58) Field of Classification Search .................. 709/224, 709/218; 370/401
See application file for complete search history.

(56) References Cited

U.S. PATENT DOCUMENTS 5,369,705 A 11/1994 Bird et al.

(Continued)

FOREIGN PATENT DOCUMENTS

EP 1248441 10/2002

(Continued)

OTHER PUBLICATIONS

"Peer-to-Peer Infrastructure: Grouping API Functions," Microsoft, http://msdn.microsoft.com/library/en-us/p2psdk/p2p/grouping_api_functions.asp?frame=true.

(Continued)

*Primary Examiner*—John Follansbee
*Assistant Examiner*—Anthony Mejia
(74) *Attorney, Agent, or Firm*—Marshall, Gerstein & Borun LLP

(57) ABSTRACT

Systems and methods are described that facilitate the management of contact information, at least some of the contact information related to entities in a serverless, peer-to-peer system. A contact store may store information regarding which other entities of a plurality of other entities are authorized to monitor presence of a user entity. Presence of an entity may generally indicate the willingness and/or ability of the entity to communicate and/or collaborate with other entities, for example. The contact store may also store information regarding which other entities of the plurality of other entities the presence of which should be monitored by the system. A user entity may be able to add contacts to and/or delete contacts from the contact store, for example. The user entity may also be able to modify the contact store to modify which other entities are authorized to monitor presence of the user entity and/or which other entities the presence information of which should be monitored by the system, for example.

20 Claims, 7 Drawing Sheets

U.S. PATENT DOCUMENTS

| | | | |
|---|---|---|---|
| 5,371,794 A | 12/1994 | Diffie et al. | |
| 5,386,542 A | 1/1995 | Brann et al. | |
| 5,706,462 A | 1/1998 | Matousek | |
| 5,712,914 A | 1/1998 | Aucsmith et al. | |
| 5,748,736 A | 5/1998 | Mittra | |
| 5,761,421 A | 6/1998 | van Hoff et al. | |
| 5,806,075 A | 9/1998 | Jain et al. | |
| 5,832,514 A | 11/1998 | Norin et al. | |
| 5,854,898 A | 12/1998 | Riddle | |
| 5,901,227 A | 5/1999 | Perlman | |
| 5,907,685 A | 5/1999 | Douceur | |
| 5,917,480 A | 6/1999 | Tafoya et al. | |
| 5,922,074 A | 7/1999 | Richard et al. | |
| 5,933,849 A | 8/1999 | Srbljic et al. | |
| 5,944,794 A | 8/1999 | Okamoto et al. | |
| 5,982,898 A | 11/1999 | Hsu et al. | |
| 5,987,376 A | 11/1999 | Olson et al. | |
| 6,012,096 A | 1/2000 | Link et al. | |
| 6,016,505 A | 1/2000 | Badovinatz et al. | |
| 6,044,350 A | 3/2000 | Weiant, Jr. et al. | |
| 6,078,948 A | 6/2000 | Podgorny et al. | |
| 6,081,845 A | 6/2000 | Kanemaki et al. | |
| 6,085,320 A | 7/2000 | Kaliski, Jr. | |
| 6,088,805 A | 7/2000 | Davis et al. | |
| 6,092,201 A | 7/2000 | Turnbull et al. | |
| 6,097,811 A | 8/2000 | Micali | |
| 6,108,687 A | 8/2000 | Craig | |
| 6,128,740 A | 10/2000 | Curry et al. | |
| 6,134,658 A | 10/2000 | Multerer et al. | |
| 6,141,760 A | 10/2000 | Abadi et al. | |
| 6,148,383 A | 11/2000 | Micka et al. | |
| 6,155,840 A | 12/2000 | Sallette | |
| 6,163,809 A | 12/2000 | Buckley | |
| 6,205,481 B1 | 3/2001 | Heddaya et al. | |
| 6,216,110 B1 | 4/2001 | Silverberg | |
| 6,237,025 B1 | 5/2001 | Ludwig | |
| 6,266,420 B1 | 7/2001 | Langford et al. | |
| 6,269,099 B1 | 7/2001 | Borella et al. | |
| 6,311,209 B1 | 10/2001 | Olson et al. | |
| 6,336,141 B1 | 1/2002 | Fujiyama et al. | |
| 6,351,813 B1 | 2/2002 | Mooney et al. | |
| 6,363,352 B1 | 3/2002 | Dailey et al. | |
| 6,470,375 B1 | 10/2002 | Whitner et al. | |
| 6,490,253 B1 | 12/2002 | Miller et al. | |
| 6,526,411 B1 | 2/2003 | Ward | |
| 6,529,950 B1 | 3/2003 | Lumelsky et al. | |
| 6,532,217 B1 | 3/2003 | Alkhatib et al. | |
| 6,560,636 B2 | 5/2003 | Cohen et al. | |
| 6,564,261 B1 | 5/2003 | Gudjonsson et al. | |
| 6,581,110 B1 | 6/2003 | Harif et al. | |
| 6,636,854 B2 | 10/2003 | Dutta et al. | |
| 6,636,889 B1 | 10/2003 | Estrada et al. | |
| 6,653,933 B2 | 11/2003 | Raschke et al. | |
| 6,654,796 B1 | 11/2003 | Slater et al. | |
| 6,658,568 B1 | 12/2003 | Ginter et al. | |
| 6,675,205 B2 | 1/2004 | Meadway et al. | |
| 6,675,261 B2 | 1/2004 | Shandony | |
| 6,683,865 B1 | 1/2004 | Garcia-Luna-Aceves et al. | |
| 6,701,344 B1 | 3/2004 | Holt et al. | |
| 6,714,966 B1 | 3/2004 | Holt et al. | |
| 6,725,281 B1 | 4/2004 | Zintel et al. | |
| 6,728,753 B1 | 4/2004 | Parasnis et al. | |
| 6,745,178 B1 | 6/2004 | Emens et al. | |
| 6,748,530 B1 | 6/2004 | Aoki et al. | |
| 6,754,829 B1 | 6/2004 | Butt et al. | |
| 6,775,782 B1 | 8/2004 | Buros et al. | |
| 6,779,004 B1 | 8/2004 | Zintel | |
| 6,791,582 B2 | 9/2004 | Linsey et al. | |
| 6,801,604 B2 | 10/2004 | Maes et al. | |
| 6,823,327 B1 | 11/2004 | Klug et al. | |
| 6,892,230 B1 | 5/2005 | Gu et al. | |
| 6,912,622 B2 | 6/2005 | Miller | |
| 6,920,455 B1 | 7/2005 | Weschler | |
| 6,968,179 B1 | 11/2005 | De Vries | |
| 6,981,043 B2 | 12/2005 | Botz et al. | |
| 6,983,400 B2 | 1/2006 | Volkov | |
| 6,986,258 B2 | 1/2006 | Goyal et al. | |
| 6,990,514 B1 | 1/2006 | Dodrill et al. | |
| 7,062,681 B2 | 6/2006 | Larsson et al. | |
| 7,065,579 B2 | 6/2006 | Traversat et al. | |
| 7,065,587 B2 | 6/2006 | Huitema et al. | |
| 7,068,789 B2 | 6/2006 | Huitema et al. | |
| 7,073,132 B1 | 7/2006 | Rydahl et al. | |
| 7,130,999 B2 | 10/2006 | Yasala et al. | |
| 7,139,760 B2 | 11/2006 | Manion et al. | |
| 7,159,223 B1 | 1/2007 | Comeau et al. | |
| 7,181,620 B1 | 2/2007 | Hur | |
| 7,185,194 B2 | 2/2007 | Morikawa et al. | |
| 7,197,049 B2 | 3/2007 | Engstrom et al. | |
| 7,213,060 B2 | 5/2007 | Kemp et al | |
| 7,272,636 B2 | 9/2007 | Pabla | |
| 7,299,351 B2 | 11/2007 | Huitema et al. | |
| 7,340,500 B2 | 3/2008 | Traversat et al. | |
| 7,346,696 B2 * | 3/2008 | Malik | 709/229 |
| 7,401,152 B2 | 7/2008 | Traversat et al. | |
| 7,401,153 B2 | 7/2008 | Traversat et al. | |
| 2001/0003191 A1 | 6/2001 | Kovacs et al. | |
| 2001/0035976 A1 | 11/2001 | Poon | |
| 2001/0053213 A1 | 12/2001 | Truong et al. | |
| 2002/0027569 A1 | 3/2002 | Manni et al. | |
| 2002/0059425 A1 | 5/2002 | Belfiore et al. | |
| 2002/0073204 A1 | 6/2002 | Dutta et al. | |
| 2002/0078243 A1 | 6/2002 | Rich et al. | |
| 2002/0097267 A1 | 7/2002 | Dinan et al. | |
| 2002/0112058 A1 | 8/2002 | Weisman et al. | |
| 2002/0120774 A1 * | 8/2002 | Diacakis | 709/245 |
| 2002/0140730 A1 | 10/2002 | Linsey et al. | |
| 2002/0143989 A1 | 10/2002 | Huitema et al. | |
| 2002/0144149 A1 | 10/2002 | Hanna et al. | |
| 2002/0154172 A1 | 10/2002 | Linsey et al. | |
| 2002/0184358 A1 | 12/2002 | Traversat et al. | |
| 2002/0188657 A1 | 12/2002 | Traversat et al. | |
| 2002/0188881 A1 | 12/2002 | Liu et al. | |
| 2002/0194484 A1 | 12/2002 | Bolosky et al. | |
| 2003/0014485 A1 | 1/2003 | Banatwala | |
| 2003/0036941 A1 | 2/2003 | Leska et al. | |
| 2003/0055892 A1 | 3/2003 | Huitema et al. | |
| 2003/0056093 A1 | 3/2003 | Huitema et al. | |
| 2003/0056094 A1 | 3/2003 | Huitema et al. | |
| 2003/0088544 A1 | 5/2003 | Kan et al. | |
| 2003/0097425 A1 | 5/2003 | Chen | |
| 2003/0117433 A1 | 6/2003 | Milton et al. | |
| 2003/0126027 A1 | 7/2003 | Nelson et al. | |
| 2003/0135629 A1 | 7/2003 | Sasaki et al. | |
| 2003/0140119 A1 | 7/2003 | Acharya et al. | |
| 2003/0147386 A1 | 8/2003 | Zhang et al. | |
| 2003/0191753 A1 | 10/2003 | Hoch | |
| 2003/0196060 A1 | 10/2003 | Miller | |
| 2003/0217073 A1 | 11/2003 | Walther et al. | |
| 2003/0217142 A1 | 11/2003 | Bobde et al. | |
| 2004/0008652 A1 | 1/2004 | Tanzella et al. | |
| 2004/0037271 A1 | 2/2004 | Liscano et al. | |
| 2004/0064693 A1 | 4/2004 | Pabla et al. | |
| 2004/0078436 A1 | 4/2004 | Demsky et al. | |
| 2004/0082351 A1 | 4/2004 | Westman | |
| 2004/0088325 A1 | 5/2004 | Elder et al. | |
| 2004/0100953 A1 | 5/2004 | Chen et al. | |
| 2004/0111423 A1 | 6/2004 | Irving et al. | |
| 2004/0111439 A1 | 6/2004 | Manion et al. | |
| 2004/0111469 A1 | 6/2004 | Manion et al. | |
| 2004/0111515 A1 | 6/2004 | Manion et al. | |
| 2004/0111525 A1 | 6/2004 | Berkland et al. | |
| 2004/0117446 A1 | 6/2004 | Swanson | |
| 2004/0120344 A1 | 6/2004 | Sato et al. | |

| | | | |
|---|---|---|---|
| 2004/0122898 A1 | 6/2004 | Srinivasa | |
| 2004/0122901 A1 | 6/2004 | Sylvain | |
| 2004/0128350 A1 | 7/2004 | Topfl et al. | |
| 2004/0133640 A1 | 7/2004 | Yeager et al. | |
| 2004/0141005 A1 | 7/2004 | Banatwala et al. | |
| 2004/0143603 A1 | 7/2004 | Kaufmann et al. | |
| 2004/0148333 A1 | 7/2004 | Manion et al. | |
| 2004/0148611 A1 | 7/2004 | Manion et al. | |
| 2004/0162871 A1 | 8/2004 | Pabla et al. | |
| 2004/0172455 A1 | 9/2004 | Green et al. | |
| 2004/0172456 A1 | 9/2004 | Green et al. | |
| 2004/0184445 A1 | 9/2004 | Burne | |
| 2004/0190549 A1 | 9/2004 | Huitema | |
| 2004/0205243 A1 | 10/2004 | Hurvig et al. | |
| 2004/0242329 A1 | 12/2004 | Blackburn et al. | |
| 2004/0249907 A1 | 12/2004 | Brubacher et al. | |
| 2004/0249970 A1 | 12/2004 | Castro et al. | |
| 2004/0255029 A1 | 12/2004 | Manion et al. | |
| 2004/0260771 A1 | 12/2004 | Gusler et al. | |
| 2004/0260800 A1 | 12/2004 | Gu et al. | |
| 2005/0004916 A1 | 1/2005 | Miller et al. | |
| 2005/0004984 A1 | 1/2005 | Simpson | |
| 2005/0009537 A1 | 1/2005 | Crocker et al. | |
| 2005/0022210 A1 | 1/2005 | Zintel et al. | |
| 2005/0027805 A1 | 2/2005 | Aoki | |
| 2005/0038856 A1 | 2/2005 | Krishnasamy et al. | |
| 2005/0066001 A1 | 3/2005 | Benco et al. | |
| 2005/0071440 A1* | 3/2005 | Jones et al. | 709/218 |
| 2005/0074018 A1 | 4/2005 | Zintel et al. | |
| 2005/0080768 A1 | 4/2005 | Zhang et al. | |
| 2005/0080848 A1 | 4/2005 | Shah | |
| 2005/0080859 A1 | 4/2005 | Lake | |
| 2005/0086300 A1 | 4/2005 | Yeager et al. | |
| 2005/0091388 A1* | 4/2005 | Kamboh et al. | 709/228 |
| 2005/0091529 A1 | 4/2005 | Manion et al. | |
| 2005/0097503 A1 | 5/2005 | Zintel et al. | |
| 2005/0102245 A1 | 5/2005 | Edlund et al. | |
| 2005/0102356 A1 | 5/2005 | Manion et al. | |
| 2005/0108371 A1 | 5/2005 | Manion et al. | |
| 2005/0114487 A1 | 5/2005 | Peng et al. | |
| 2005/0125529 A1 | 6/2005 | Brockway et al. | |
| 2005/0125560 A1 | 6/2005 | Brockway et al. | |
| 2005/0171799 A1 | 8/2005 | Hull et al. | |
| 2005/0177715 A1 | 8/2005 | Somin et al. | |
| 2005/0198173 A1 | 9/2005 | Evans | |
| 2005/0235038 A1 | 10/2005 | Donatella et al. | |
| 2006/0031451 A1* | 2/2006 | Lortz | 709/223 |
| 2006/0036692 A1* | 2/2006 | Morinigo et al. | 709/206 |
| 2006/0112177 A1* | 5/2006 | Barkley et al. | 709/224 |
| 2006/0161554 A1* | 7/2006 | Lucovsky et al. | 707/10 |
| 2006/0173959 A1* | 8/2006 | McKelvie et al. | 709/204 |
| 2006/0190600 A1 | 8/2006 | Blohm et al. | |
| 2006/0212583 A1 | 9/2006 | Beadle et al. | |
| 2006/0239295 A1 | 10/2006 | Rao et al. | |
| 2006/0242235 A1* | 10/2006 | Classen et al. | 709/204 |
| 2006/0242236 A1 | 10/2006 | Manion et al. | |
| 2007/0220156 A1 | 9/2007 | Dickerman et al. | |
| 2007/0233875 A1* | 10/2007 | Raghav et al. | 709/227 |
| 2007/0239869 A1* | 10/2007 | Raghav et al. | 709/224 |
| 2008/0005325 A1* | 1/2008 | Wynn et al. | 709/225 |
| 2008/0031460 A1 | 2/2008 | Brookner et al. | |

FOREIGN PATENT DOCUMENTS

| | | |
|---|---|---|
| GB | 2378268 | 2/2003 |
| JP | 2002197246 | 11/2001 |
| JP | 2002335269 | 11/2002 |
| WO | WO-0120450 | 3/2001 |
| WO | WO-2005/046164 A1 | 5/2005 |

OTHER PUBLICATIONS

"Peer-to-Peer Infrastructure: Creating a Group Chat Application," Microsoft, http://msdn.microsoft.com/library/en-us/p2psdk/p2p/creating_a_group_chat_application.asp . . ..

"Peer-to-Peer Infrastructure: PeerGroupEnumMembers," Microsoft, http://msdn.microsoft.com/library/en-us/p2psdk/p2p/peergroupenummembers.asp?frame=true.

"Peer-to-Peer Infrastructure: Identity Manager Functions," Microsoft, http://msdn.microsoft.com/library/en-us/p2psdk/p2p/identity_manager_functions.asp?frame.

D. Chappell, "*Introducing Indigo: An Early Look,*" (Longhorn Technical Articles) dated Feb. 2005, Microsoft.com Library, 18 pages.

D. Box, "Code Name Indigo: A Guide to Developing and Running Connected Systems With Indigo," dated Jan. 2004, MSDN Magazine, 11 pages.

The Cable Guy, "*Windows Peer-to-Peer Networking: The Cable Guy—Nov. 2003,*" updated Aug. 5, 2004, Microsoft TechNet, 7 pages.

"Teredo Overview," Microsoft Corporation, website, 30 pages available at http://www.microsoft.com/technet/prodtechnol/winxppro/maintain/teredo.mspx, © 2003 Microsoft Corporation.

European Search Report for EP 06111103 dated Jul. 3, 2006.

Loesing et al., An Implementation of Reliable Group Communication based on the Peer-to-Peer Network JXTA, IEEE, 2005.

Rowstron et al., Pastry: Scalable, distributed object location and routing for large-scale peer-to-peer systems, at Microsoft Research, Ltd., St. George House and Rice University, 20 pages.

Ellison, C., *SPKI Requirements*, (The Internet Society 1999), at http://www.ietf.org/rfc/rfc2692.txt?number=2692 (Aug. 6, 2001).

Dabek, F., et al., *Building Peer-to-Peer Systems With Chord, a Distributed Lookup Serivce*, at MIT Laboratory for Computer Science, 6 pages, at http://pdos.lcs.mit.edu/chord.

Langley, A., *The Freenet Protocol*, The Free Network Project, at http://freenet.sourceforge.net/index/php?page=protocol (May 21, 2001).

Druschel, P., et al., *PAST: A large-scale, persistent peer-to-peer storage utility*, at Rice University and Microsoft Research, 6 pages.

Ellison, C., et al., *Simple Public Key Certificate*, (Internet Draft 1999), at http://www.world.std.com/~cme/spki.txt (Aug. 6, 2001).

Erdelsky, P., *The Birthday Paradox*, EFG, at http://www.efgh.com/math/birthday.htm (Mar. 8, 2002).

Rowstron et al., *SCRIBE: The design of a large-scale event notification infrastructure*, at Microsoft Research, Ltd., St. George House and Rice University, 20 pages.

Lai, K. et al., *Measuring Link Bandwidths Using a Deterministic Model of Packet Delay*, at Department of Computer Science at Stanford University, 13 pages.

Ellison, C., et al., *SPKI Certificate Theory*, (The Internet Society 1999), at http://www.ietf.org/rfc/rfc2693.txt?number=2693 (Aug. 6, 2001).

*Red-Black Tree*, National Institute of Standards and Technology, at http://www.nist.gov/dads/HTML/redblack.html (Mar. 5, 2002).

Rowstron et al., *Storage management and caching in PAST, a large-scale, persistent peer-to-peer storage utility*, at Microsoft Research, Ltd., St. George House and Rice University, 14 pages.

Microsoft Corporation; "Introduction to Windows Peer-to-Peer Networking," Published: Jan. 2003.

"Microsoft Computer Dictionary," Fifth Edition, Microsoft Press, 2002p pp. 31, 238-239, 424, 467.

Tanenbaum, Andrew S., "Computer Networks," Third Edition, Prentice Hall PTR, 1996; pp. 437-449.

"Project JXTA: Technical Shell Overview," Sun Microsystems, Inc. Apr. 25, 2001; retrieved from http://www.jxta.org/project/www.docs/TechShellOverview.pdf on Aug. 10, 2006.

"Project JXTA: Technical Specification," Version 1.0, Sun Microsystems, Inc., Apr. 25, 2001; retrieved from http://download.jxta.org/files/documents/27/12/JXTA-Spec.pdf on Aug. 10, 2006.

Gong, Li. "Project JXTA: A Technology Overview," Sun Microsystems, Inc., Apr. 25, 2001; retrieved from http://download.jxta.org/files/documents/27/35/JXTA-Tech-Overview.pdf on Aug. 10, 2006.

"Products: Groove Virtual Office Fax," Groove Networks, retrieved from http://www.groove.net/index.cfm?pagename=VO_FAX on May 31, 2005 (5 pages).

"Products: Groove Virtual Office," Groove Networks, retrieved from http://www.groove.net/index.cfm/pagename/VirtualOFfice on May 31, 2005 (2 pages).

"Products: Why Grove," Groove Networks, retrieved from http://www.grove.net/index.cfm?pagename=Products_Overview on May 31, 2005 (2 pages).

"Microsoft, Groove Networks to Combine Forces to Create Anytime, Anywhere Collaboration," Microsoft Presspass-Information for Journalists, retrieved from http://www.microsoft.com/prespass/features/2005/mar05/03-10GrooveQA.asp on May 31, 2005 (9 pages).

Newmarch, J., "JXTA Overview," Oct. 7, 2002, retrieved from http://jan.netcomp.monash.edu.au/distjava/jxta.html on Jun. 2, 2005 (pp. 1-15).

"News: Sun Incorporating JXTA into Products," java.net The Source for Java Technology Collaboration, Jan. 30, 2004, retrieved from http://today.java.net.pub/n/SunKXTA on Jun. 2, 2005 (1 page).

Traversat et al., "Project JXTA Virtual Network," Sun Microsystems, Inc. Oct. 28, 2002 (pp. 1-10).

"Project JXTA: An Open, Innovative Collaboration," Sun Microsystems, Inc. Apr. 25, 2001, (pp. 1-5).

Bolcer et al., "Peer-to-Peer Architectures and the Magi™ Open-Source Infrastructure," Endeavors Technology, Inc., Dec. 6, 2000.

Reynolds, J., "BOOTP Vendor Information Extensions," Network Working Group, http://www.faqs.org/rfc/rfc1395.txt, retrieved Dec. 23, 2005, Jan. 1993.

"Publication Related to Pastry," http://research.microsoft.com/~antr/Pastry/pubs.htm.

The Gnutella Protocol Specification v0.4, http://www.clip2.com.

Tyson, "How the Old Napster Worked," http://computer.howstuffworks.com/napster.htm/printable.

Handley et al., "SIP: Session Initiation Protocol," Network Working Group, Request for Comments 2543, pp. 1-153 (Mar. 1999).

About Presentation Broadcasting, 3 pages printed Jul. 1, 2005 from http://office.microsoft.com/en-us/assistance/HP052411931033.aspx.

Schmidt et al., "A Generic System for Web-Based Group Interaction," in Proceedings of the Thirty-First Hawaii International Conference on System Sciences, vol. I, pp. 545-554 (Kohala Coast, HI, Jan. 6-9, 1998).

Castro et al., *Topology-Aware Routing In Structured Peer-to-Peer Overlay Networks,* Technical Report MSR-TR-2002-82, Microsoft Research, Microsoft Corporation, http://www.research.microsoft.com.

Greenberg et al, "Using a Room Metaphor to Ease Transitions in Groupware," University of Calgary, Department of Computer Science, Research Report 98/611/02, 31 pages (1998).

"IBM Workplace Collaboration Services Overview Guide" dated Jan. 2005, 2 pages. (Printed from ftp://ftp.lotus.com/pub/lotusweb/IGM_Workplace_collaboration_services_g224733301_118.pdf on Jul. 1, 2005).

Kollock et al., "Managing the Virtual Commons: Cooperation and Conflict in Computer Communities," in Computer-Mediated Communication: Linguistic, Social, and Cross-Cultural Perspectives, (Herring, ed.), pp. 109-128 (John Benjamins, Amsterdam, Netherlands, 1996) http://research.microsoft.com/scg/papers/KollockCommons.htm.

The Best Way to Centrally Deploy Applications and Provide On-Demand Access, 2 pages printed Jul. 1, 2005 from http://www.citrix.com/English/ps2/products/product.asp?contentID=186.

Smith et al., "The Social Life of Small Graphical Chat Spaces," in Proceedings of the SIGCHI Conference on Human Factors in Computing Systems, pp. 462-469 (The Hague, Netherlands, Mar. 2000) http://research.microsoft.com/scg/papers/vchatchi2000.pdf.

SlidesNow! (3 pages) printed Jul. 1, 2005 from http://www.slidesnow.com/about.shtml.

*"Presence and Awareness Services,"* Ramiro Liscano, Professor, SITE, University of Ottawa, 89 pages, http://www.site.uottawa.ca/-rliscano/tutorials/PresenceAwarenessServices.pdf.

QuickTime Broadcaster (3 pages) printed Jul. 1, 2005 from http://www.apple.com/quicktime/broadcaster/.

*"Connecting and Extending Peer-to-Peer Networks,"* Lion Share White Paper, dated Oct. 2004, 32 pages, http://lionshare.its.psu.edu/main/info/docspresentation/LionshareWP.pdf.

Greenberg, "Collaborative Interfaces for the Web," in Human Factors and Web Development, (Forsythe et al., eds.) Chapter 18, pp. 241-253, LEA Press, (1997).

"Design Explorations," IBM Research: Social Computing Group (4 pgs.).

MeetingMaker—Meeting Maker printout, 2 pages printed on Jul. 1, 2005 from http://www.meetingmaker.com/products/meetingmaker/default.cfm.

Smith et al., "What Do People Do in Virtual Worlds? An Analysis of V-Chat Log File Data," Microsoft Corporation Report (Apr. 1, 1998) http://research.microsoft.com/scg/papers/kollockvpchat.pdf.

Garcia et al., "Extending a Collaborative Architecture to Support Emotional Awareness," EBAA '99—Workshop on Emotion-Based Agent Architectures, pp. 46-52 (May 2, 1999).

Farnham et al., "Supporting Sociability in a Shared Browser," in Proceedings of Interact Conference (Tokyo, Japan, Jul. 2001) http://research.microsoft.com/scg/papers/sharedbrowsinginteract.pdf, pp. 1-8.

Kollock, "The Economies of Online Cooperation: Gifts and Public Goods in Cyberspace," in Communities in Cyberspace, (Smith et al, eds.), pp. 1-17 (Routledge, London, UK, 1999) http://www.sscnet.ucla.edu/soc/faculty/kollock/papers/economies.htm.

Lee et al., "Supporting Multi-User, Multi-Applet Workspaces in CBE," in Proceedings of the ACM 1996 Conference on Computer Supported Cooperative Work, pp. 344-353 (Cambridge, MA, 1996.

Duhr, "Oberflachenelemente in interaktiven und kooperativen anwendungen," Universitat Oldenburg, Department of Information Systems Thesis (Aug. 2000).

MeetingMaker—WebEvent Publish printout, 2 pages printed on Jul. 1, 2005 from http://www.meetingmaker.com/products/webevent_publish/default.cfm.

Cheung, *"Chatopus for Palm OS, Using IM Bots for Jabber,"* Chatopus-Palm OS Instant Messaging Client for XMPP/Jabber, Dated Oct. 20, 2002 (Last updated: Jun. 25, 2005), 6 pages, http://www.chatopus.com/articles/bots.html.

Zhao, et al., "A Web Based Multi-Display Presentation System," 2 pages printed Jul. 1, 2005 from http://www.fxpal.com/publications/FXPAL-PR-04-303.pdf.

Cugola et al., "Peer to Peer for Collaborative Applications," in Proceedings of the 22nd International Conference on Distributed Computing Systems Workshops (ICDCS'02), pp. 359-364 (Vienna, Austria, Jul. 2-5, 2002).

Gutwin, "Workspace Awareness in Real-Time Distributed Groupware," The University of Calgary, Department of Computer Science, Ph.D. Thesis, 270 pages (Dec. 1997).

"At What Cost Pervasive? A Social Computing View of Mobile Computing Systems," IBM Research: vol. 38, No. 4, 1999, Pervasive Computing (28 pgs.).

Castro et al., *"Secure Routing for Structured Peer-to-Peer Overlay Networks,"* Usenix, OSDI '02 Paper (OSDI '02 Tech Program Index) pp. 299-314 of the Proceedings, Fifth Symposium on Operating Systems Design and Implementation (OSDI 2002) 33 pages, http://www.usenix.org/events/osdi02/tech/full_papers/castro/castro_html/.

Boyer et al., "Virtual Social Clubs: Meeting Places for the Internet Community," IEEE International Conference on Multimedia Computing and Systems, pp. 297-301 (Florence, Italy, Jun. 7-11, 1999).

"IBM Lotus Instant Messaging and Web Conferencing," IBM Software—IBM Lotus Instant Messaging and Web Conferencing home page (3 pgs.).

Dorohonceanu et al., "A Desktop Design for Synchronous Collaboration," in Proceedings of the Graphics Interface '99 (GI'99), pp. 27-35 (Kingston, Ontario, Canada, Jun. 1999).

Cheng et al., "Hutchworld: Lessons Learned. A Collaborative Project: Fred Hutchinson Cancer Research Center & Microsoft Research," in Proceedings of Second International Conference on Virtual Worlds (VW 2000), pp. 1-2 (Paris, France, Jul. 5-7, 2000). http://research.microsoft.com/scg/papers/hutchvw2000.pdf.

Bouvin, "Designing User Interfaces for Collaborative Web-Based Open Hypermedia," in Proceedings of the Eleventh ACM Conference on Hypertext and Hypermedia, pp. 230-231 (San Antonio, TX, 2000).

European Search Report; EP 02 00 5770; Munich; Aug. 9, 2005.

Oram, A.,; Peer -to-Peer: Harnessing the Benefits of a Disruptive Technology Passage; Peer-to-Peer: Harnessing the Benefits of a Disruptive Technology; Mar. 15, 2001; pp. 94-122.

Sedgewick R.; Algorithms in C—Third Edition—Part of Chapter XVI; Algorithms in C—Third Edition, 1998; pp. 662-691.

Morris, J.; Data Structures and Algorithms—Sections 8.3; Online Publication 1998; http://clips.ee.uwa.edu.au/{morris/Year2/PLDS210/hash_tables.html.>: Aug. 8, 2005.

Sedgewick, R.; Algorithms in C—Third Edition—Chapter XIV; Algorithms in C++; 1998; pp. 573-608; Section 14.4.

Partial European Search Report; EO 02 00 5770; Mar. 27, 2005.

Huitema, C., Distributed Peer-to-Peer Name Resolution, Presentation Slides from the O'Reilly Peer-to-Peer and Web Services Conference, Nov. 5, 2001.

Adamic, L., "P2P Search that Scales," pre-presentation description for talk on Nov. 7, 2001, http://conferences.oreillynet.com/cs/p2web2001/view.

Microsoft.com, "Peer-to-Per Common Documentation," http://msdn.microsoft.com/library/default.asp?url=/library/en-us/p2psdk/p2p/peer_to_common_documentation.asp, (last visited Aug. 5, 2005).

Sunaga et al., "Advanced Peer-to-Peer Network Platform for Various Services-SIONet (Semantic Information Oriented Network)", *Proceedings of the Second International Conference on Peer-to-Peer Computing*, IEEE, pp. 169-170 (2002).

Ratnasamy et al., "A Scalable Content-Addressable Network", *SIGCOMM '01*, ACM, pp. 161-172 (2001).

Saroiu et al., "A Measurement Study of Peer-to-Peer File Sharing Systems", *Technical Report #UW-CSE-01-06-02*, Department of Computer Science & Engineering, University of Washington, Seattle, Washington, 14 pages (2001).

Legedza et al., "Using Network-level Support to Improve Cache Routing", Hamilton et al., (Ed.), *Computer Networks and ISDN Systems: The International Journal of Computer and Telecommunications Networking*, vol. 30, No. 22-23, pp. 2193-2201 (1998).

Stoica et al., "Chord: A Scalable Peer-to-Peer Lookup Service for Internet Applications", *SIGCOMM '01*, ACM, pp. 149-160 (2001).

Clark et al., "Freenet: A Distributed Anonymous Information Storage and Retrieval System", H. Federrath (Ed.), *Anonymity 2000*, LNCS 2009, pp. 46-66 (2001).

International Search Report for PCT/US06/15050 mailed Oct. 23, 2007.

Portmann et al., "The Cost of Peer Discovery and Searching in the Gnutella Peer-to-peer File Sharing Protocol", *Proceedings Ninth IEEE International Conference on Networks*, pp. 263-268 (2001).

Portmann, M., et al., "The Cost of Application-level Broadcast in a Fully Decentralized Peer-to-peer Network", *Proceedings ISCC 2002 Seventh International Symposium*, pp. 941-946 (2002).

Hong et al., "Dynamic Group Support in LANMAR Routing Ad Hoc Networks," *IEEE*, pp. 304-308 (2002).

Zhang et al., "gMeasure: A Group-based Network Performance Measurement Service for Peer-to-Peer Applications", *IEEE Globecom 2002*, 5 pgs (2002).

Xiao et al., "On Reliable and Scalable Peer-to-Peer Web Document Sharing", *Proceedings of the International Parallel and Distributed Processing Symposium*, IEEE, pp. 23-30 (2002).

Hoschek, Wolfgang, "A Unified Peer-to-Peer Database Framework for Scalable Service and Resource Discovery", M. Parasher (Ed.), *GRIG 2002*, LNCS 2536, pp. 126-144 (2002).

Labovitz et al., "Internet Routing Instability", *SIGCOMM '97*, ACM, pp. 115-126 (1997).

Joa-Ng, M. et al., "A GPS-based Peer-to-Peer Hierarchical Link State Routing for Mobile Ad Hoc Networks", *IEEE 51$^{st}$ Vehicular Technology Conference Proceedings*, vol. 3, pp. 1752-1756 (2000).

Zhao et al., "Tapestry: An Infrastructure for Fault-tolerant Wide-area Location and Routing", Report No. UCB/CSD-01-1141, Computer Science Division (EECS), University of California, Berkeley, California, 27 pgs (2001).

Kwon et al., "An Efficient Peer-to-Peer File Sharing Exploiting Hierarchy and Asymmetry", *IEEE*, pp. 226-233 (2003).

Joa-Ng, M. et al., "A Peer-to-Peer Zone-Based Two-Level Link State Routing for Mobile Ad Hoc Networks", *IEEE Journal on Selected Areas in Communications*, vol. 17, No. 8, pp. 1415-1425 (Aug. 1999).

"*Microsoft Overhauls Longhom Drivers for Usability, Connectivity,*" eWeek.com Enterprise News & Reviews, dated Dec. 14, 2005, 5 pages; http://www.eweek.com/article2/0,1759,1654462,00.asp.

Beatty et al., "*Web Services Dynamic Discovery (WS-Discovery)*," Microsoft Corporation, dated Apr. 2005, 42 pages; http://msdn.microsoft.com/library/en-us/dnglobspec/html/WS-Discovery.pdf.

Gagnes et al., "*Discovering Semantic Web Services In Dynamic Environments,*" Norwegian Defence Research Establishment (FFI), University of Oslo, Department of Informatics, Oslo, Norway, 4 pages; http://wscc.info/p51561/files/paper61.pdf.

"*METEOR-S Web Service Discovery Infrastructure,*" A Component of the METEOR-S System on Semantic Web Services and Processes; METEOR-S Web Service Discovery Infrastructure (MWSDI); dated Dec. 14, 2005, 2 pages; http://lsdis.cs.uga.edu/proj/meteor/mwsdi.html.

Written Opinion for PCT/US06/15050 mailed Oct. 23, 2007.

\* cited by examiner

CONTACT MANAGEMENT IN A SERVERLESS PEER-TO-PEER SYSTEM

CROSS-REFERENCES TO RELATED APPLICATIONS

This is a continuation of U.S. application Ser. No. 11/112,135, filed Apr. 22, 2005, the entire disclosure of which is incorporated herein by reference.

The subject matter of the present application is generally related to the following commonly-owned applications:

U.S. patent application Ser. No. 11/112,134, entitled "PRESENCE MONITORING IN A SERVERLESS PEER-TO-PEER SYSTEM";

U.S. patent application Ser. No. 11/112,347, entitled "AN APPLICATION PROGRAMMING INTERFACE FOR INVITING PARTICIPANTS IN A SERVERLESS PEER TO PEER NETWORK"; and U.S. patent application Ser. No. 11/112,133, entitled "AN APPLICATION PROGRAMMING INTERFACE FOR DISCOVERING ENDPOINTS IN A SERVERLESS PEER TO PEER NETWORK".

These applications are hereby incorporated by reference herein in their entireties for all purposes.

BACKGROUND

Server based communication services such as the Messenger service provided by MSN® communication services permit users to sign into a server-based network and then use the services of the network (e.g., e-mail, text messaging, etc.). A server may store a contact list for the user and the user can add and delete persons from the contact list. When the user signs in, a server or servers may notify persons in the user's contact list that the user is "online." Similarly, the server or servers may notify the user of persons in the user's contact list that are "online."

The MICROSOFT® Corporation also provides Peer-to-Peer Networking software for use with its WINDOWS® operating systems. With this system, users can create a network of peer computers and can communicate with one another without having to sign into a central server. For example, users can create a peer-to-peer group and then create a chat room in which all members of the group can post messages and see messages posted by others in the group. The chat room is maintained using the peer computers and without the need for a central server.

SUMMARY

Systems and methods are described that facilitate the management of contact information, at least some of the contact information related to entities in a serverless, peer-to-peer system. A contact store may store information regarding which other entities of a plurality of other entities are authorized to monitor presence of a user entity. Presence of an entity may generally indicate the willingness and/or ability of the entity to communicate and/or collaborate with other entities, for example. The contact store may also store information regarding which other entities of the plurality of other entities the presence of which should be monitored by the system. A user entity may be able to add contacts to and/or delete contacts from the contact store, for example. The user entity may also be able to modify the contact store to modify which other entities are authorized to monitor presence of the user entity and/or which other entities the presence information of which should be monitored by the system, for example.

DRAWINGS

DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
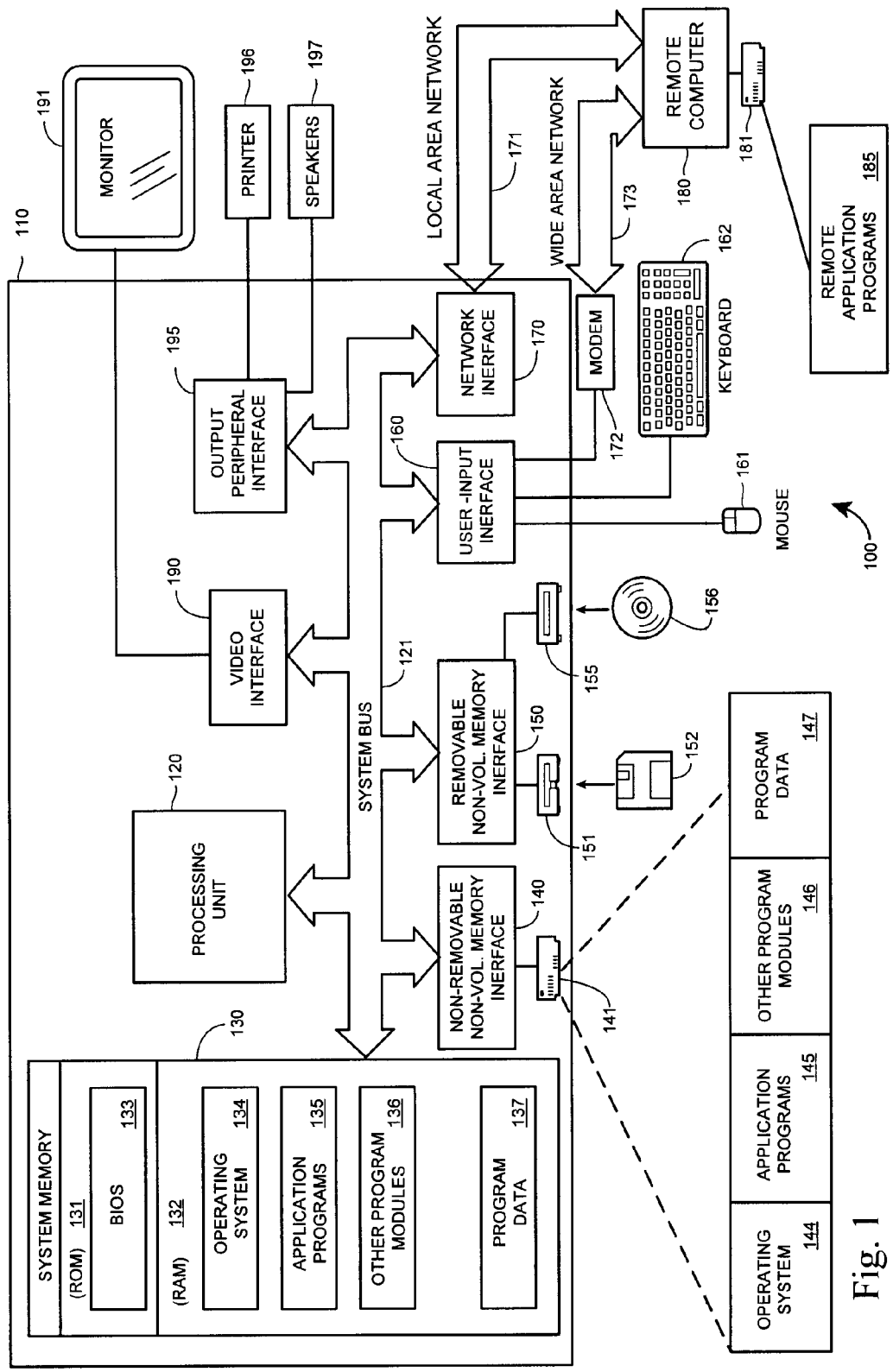
FIG. 1 is a block diagram of a computing system that may operate in accordance with the claims.

FIG. 1 illustrates an example of a suitable computing system environment 100 on which a system for the steps of the claimed method and apparatus may be implemented. The computing system environment 100 is only one example of a suitable computing environment and is not intended to suggest any limitation as to the scope of use or functionality of the method of apparatus of the claims. Neither should the computing environment 100 be interpreted as having any dependency or requirement relating to any one or combination of components illustrated in the exemplary operating environment 100.

The steps of the claimed method and apparatus are operational with numerous other general purpose or special purpose computing system environments or configurations. Examples of well known computing systems, environments, and/or configurations that may be suitable for use with the methods or apparatus of the claims include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The steps of the claimed method and apparatus may be described in the general context of computer-executable instructions, such as program modules, being executed by a computer. Generally, program modules include routines, programs, objects, components, data structures, etc. that perform particular tasks or implement particular abstract data types. The methods and apparatus may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the steps of the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
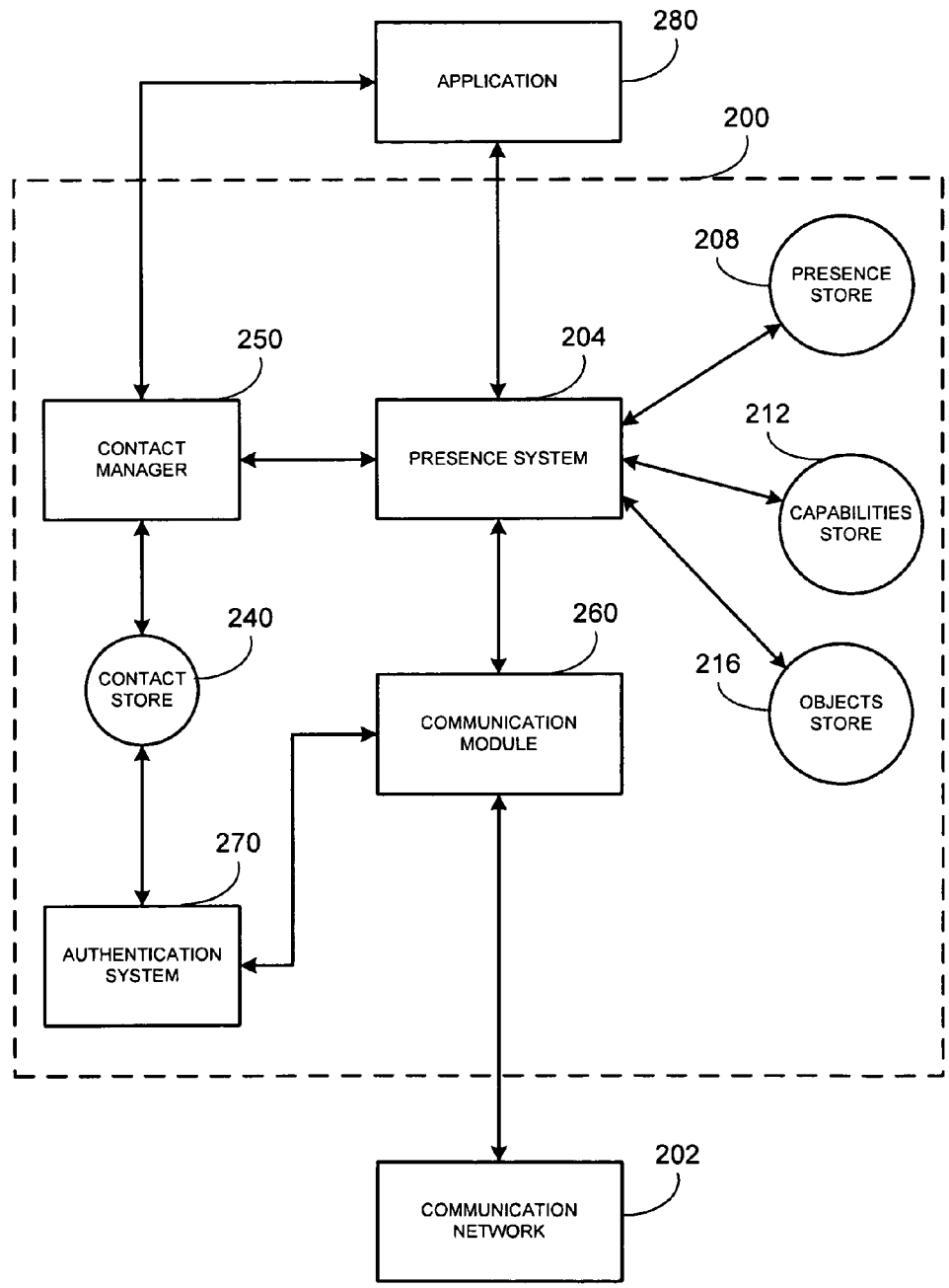
FIG. 2 is a block diagram of an example system that may facilitate peer-to-peer, serverless collaboration and/or communications.

FIG. 2 is a block diagram of an example system 200 that may be used to implement example methods described herein. The system 200 may facilitate peer-to-peer, serverless collaboration and/or communications via a communication network 202, and may be implemented using a computing system such as the computing system 100 of FIG. 1. The communication network 202 may comprise a LAN and/or a WAN, for example. In some implementations, a communication network 202 may be omitted and communications with other computing systems may occur in a point-to-point manner, for example.

The system 200 may include a presence system 204 that monitors the presence of other entities on the communication network 202. An entity may be, for example, a particular person, a position in an organization (e.g., "manager," "customer service representative," etc.), an organization, a device (e.g., a printer, a copier, a scanner, a computer, etc.), etc. Presence may generally refer to a current status of an entity with regard to their willingness or ability to communicate with other entities, but may also refer to additional or alternative information regarding the entity such as a current activity of the entity. Presence of an entity may be represented by presence information. Examples of presence information may include one or more of an indication that an entity is "online," an indication that an entity is "offline," an indication that an entity is "out to lunch," an indication that an entity is "away," an indication that an entity will "be right back," an indication that an entity is "idle," an indication that an entity is "busy," an indication that an entity is "on the phone," an indication that an entity is "watching a movie," an indication that an entity is "playing Halo®," an indication that an entity is "helping another customer," etc. The indications described above could comprise identifiers associated with presence states (e.g., number 7 indicates presence is "online"), one or more strings (e.g., the string "online"), etc. Also, presence information may be selectable from a set of allowable presence states and/or a user entity may be able to define custom presence states that can be represented, for example, by a string. For example, a user entity could define a custom presence state as "I'm out of the office. Will be back tomorrow." Presence information obtained by the presence system 204 may be stored in a presence store 208.

The presence system 204 may facilitate a user entity to monitor (or "subscribe") to presence information of other entities. This may comprise the presence system 204 polling other computing systems periodically, for example. Additionally or alternatively, other computing systems corresponding to other user entities may transmit event indications to the system 200 that notify the presence system 204 of events such as a change in presence state. For example, an event may occur when a user's presence changes from "offline" to "online," and the presence system 204 may detect this event. The presence system 204 could then notify other applications or software modules (e.g., such as the application 280) that the event occurred.

The presence system 204 may also monitor capabilities of other entities published on the network. Capabilities of an entity may include, for example, static capabilities such as whether a computing system of the entity is configured to execute a particular software application, whether a computing system of the entity has a particular hardware device, etc. Capabilities of an entity may also include, for example, dynamic capabilities such as real-time capabilities of an entity with respect to a game software application currently being executed on the entity's computing system, etc. An entity publishing capabilities on the network may refer to permitting other entities to be able to monitor the capabilities via the network. Capability information obtained by the presence system 204 may be stored in a capability store 212.

The presence system 204 may also monitor objects of other entities published on the network 202. Objects of an entity may include, for example, data objects such as files, structures, pictures, sounds, a description such as meta-data, a name-value pair, etc. An entity publishing objects on the network may refer to permitting other entities to be able to monitor the objects via the network. As just one example, publishing an object may permit an entity to provide other entities with information specific to an application being executed by a computing system of the entity and/or real-time information. With respect to a game application, for instance, a published object could include information regarding a player's current score, a weapon currently in possession of the player, etc. Objects information obtained by the presence system 204 may be stored in an objects store 216.

The presence system 204 may also provide (or "publish") presence information associated with a user entity (i.e., the entity associated with the system 200) to other entities on the network 202. The presence information associated with the user entity may be stored in the presence store 208 or some other storage. Similarly, the presence system 204 may also provide (or "publish") information regarding capabilities of the user entity to other entities on the network 202. The capability information associated with the user entity may be stored in the capability store 208 or some other storage. Further, the presence system 204 may also provide (or "publish") information regarding objects of the user entity to other entities on the network 202. The object information associated with the user entity may be stored in the objects store 216 or some other storage.

The presence system 204 may interface with a contact store 240 that stores information regarding other entities. The contact store 240 may store information for an entity such as one or more of a secure identifier, a human readable alias, an indicator of whether presence information for this entity is to be monitored, and an indicator of whether to allow this entity to obtain presence information regarding the user entity. An entity as represented in the contact store 240 may be referred to as a contact.

The presence system 204 may access the contact store 240 via a contact manager 250. The contact manager 250 may provide a set of application programming interfaces (APIs) that permit the presence system 204 to retrieve information from the contact store 240 and to optionally modify the contact store 240. For example, the contact manager 250 may provide APIs that permit adding a contact, updating contact information, deleting a contact, getting contact information, getting an enumeration of contacts stored in the contact store, etc.

Each entity may have one or more communication endpoints with which it is associated. Generally, different communication endpoints associated with an entity may comprise different communication termination points associated with the entity, such as different computing systems. As an example, endpoints for a particular entity may comprise a desktop computer at work, a desktop computer at home, a personal digital assistant (PDA), etc. Optionally, different communication endpoints associated with an entity may also comprise different software applications being executed by a single computing system.

The presence system 204 may also interface with a communication module 260, which is coupled to the communication network 202. The communication module 260 may establish connections between the system 200 and other peer computing systems associated with other entities. Establishing a connection may comprise, for example, one or more of determining an endpoint associated with an entity, resolving an address of the endpoint, authenticating communications, encrypting and decrypting communications, etc. In one implementation, the communication module 260 may interface with an authentication system 270 that is itself coupled to the contact store 240. In attempting to establish a connection with another computing system, the communication module 260 may receive from the other computing system an indication of an identifier associated with an entity. The authentication system 270 may then check whether information associated with a user entity corresponding to the identifier is stored in the contact store 240. As just one example, the authentication system 270 could check whether the identifier is stored in the contact store 240. If information associated with the user entity corresponding to the identifier is not found in the contact store 240, the connection may be refused.

A connection may be secured. Establishing a connection and communicating over a connection may comprise, for example, one or more of utilizing a secure channel, utilizing secure socket layer (SSL) techniques, utilizing transport layer security (TLS) techniques, utilizing public/private key pairs, utilizing authentication techniques (e.g., X.509 certificates, encrypted signatures utilizing a pretty good privacy (PGP) program, etc.), utilizing a peer name resolution protocol (PNRP), transmission control protocol (TCP), internet protocol (IP), internet protocol version six (IPv6), etc. Resolving an address of an endpoint may comprise, for example, resolving a PNRP identifier to an IP address and a port.

A software application 280 or some other software module may communicate with the presence system 204 to obtain presence information, capabilities information, and/or objects information associated with other user entities on the communication network 202. For example, the presence system 204 may provide a set of APIs that permit software applications and other software modules to request and receive information regarding presence, capabilities, and/or objects associated with other user entities. The presence system 204 may retrieve the requested information from the presence store 208, capabilities store 212, and/or the objects store 216. Additionally or alternatively, the presence system 204 could obtain requested information from the other user entities via the communication module 260 and the communication network 202.

Similarly, the software application 280 or some other software module may communicate with the contact manager 250 to modify the contact store 240 and/or get information from the contact store 240. The software application 280 or some other software module may utilize APIs provided by the contact manager 250 to modify the contact store 240 and/or get information from the contact store 240. Some of the blocks in FIG. 2 may communicate with other blocks using remote procedure call (RPC) techniques, although other techniques for inter-process communication can be used as well.

Contact Store

As discussed above, the contact store 240 may comprise a store of information regarding other entities or contacts. Some of the information stored in the contact store may comprise information that can be used to authenticate information received from others. For example, a contact may provide a user with an encrypted version of a unique identifier for the contact (e.g., an X.509 certificate, a digital signature encrypted using PGP, etc.). The encrypted version of the unique identifier may be stored in the contact store. In such an implementation, at least some information in the contact store may be retrieved, updated, deleted, etc., via cryptographic application programming interfaces (crypto APIs), for example. Also, in such an implementation, the contact store 240 may be access control list (ACL) protected such that only the user can read from or write to the contact store 240, for example. Optionally, others could be given access rights as well such as an administrator, a supervisor, someone the user permits, etc.

In one implementation, the contact store 240 may include, for each contact, a secure unique identifier, a human readable alias for the contact, an indicator of whether the presence of the contact is to be monitored, and an indicator of whether the contact is authorized to monitor the presence of the user. The unique identifier may be secured via a digital signature such as, for example, an X.509 certificate, or the like. The X.509 certificate may be a third-party certificate or, optionally, a self-signed certificate. The unique identifier may be stored in the contact store 240 by storing the X.509 certificate, for example. The unique identifier may comprise any of a variety of identifiers that may permit the contact to be located on a network. For example, the unique identifier may comprise a peer name resolution protocol (PNRP) identifier, an internet protocol (IP) address, etc. In one implementation, the unique identifier cannot be edited by a user in order to maintain security. The alias may comprise, for example, a human recognizable string such as "John Smith," or "Mom." In some implementations, a user may be able to modify the alias if desired.

The indicator of whether the presence of the contact is to be monitored may comprise, for example, a Boolean variable that may be set by the user to "TRUE" or "FALSE." Alternatively, the indicator of whether the presence of the contact is to be monitored may comprise a variable that can take on a larger range of values such as a value indicating that the presence of the contact is to be monitored during business hours, the presence of the contact is to be monitored depending upon some other variable, etc. The indicator of whether the presence of the contact is to be monitored may comprise a variable that can assume various values indicating, for example, that the contact has not yet been granted permission to monitor the user's presence, the contact is not allowed to monitor the user's presence, or the contact is allowed to monitor the user's presence. The variable may be allowed assume other values additionally or alternatively such as values indicating that the contact may be able to monitor the user's presence during business hours, the contact may be able to monitor the user's presence depending upon some other variable, etc.

Other information associated with a contact may be stored in the contact store 240 as well such as a mailing address, an e-mail address, a telephone number, etc. Also, classification information for the contact may be stored such as whether the contact is a personal contact, a business contact, a family contact, a friend contact, etc.

The indicator of whether a contact is authorized to monitor the presence of the contact may also comprise, for example, a variable that indicates a category of which the contact is a member as well, as a variable that indicates whether members of the category are authorized to monitor the presence of the contact. Similarly, the indicator of whether the presence of the contact is to be monitored may comprise, for example, a variable that indicates a category of which the contact is a member, as well as a variable that indicates whether the presence of members of the category are to be monitored.

Optionally, the contact store could also include indicators of whether contacts are authorized to monitor capabilities and/or objects of the user, as well as indicators of whether capabilities and/or objects of contacts are to be monitored. For example, a contact may have associated with it an indicator or indicators of whether the contact is authorized to monitor capabilities and/or objects of the user. Similarly, a contact may have associated with it an indicator or indicators of whether capabilities and/or objects of the contact should be monitored. Alternatively, determination of whether capabilities and/or objects of contacts should be monitored and/or if contacts are authorized to monitor capabilities and/or objects of the user may be based on the indicators associated with presence discussed above, for example.

The contact store 240 may be stored in a non-volatile memory (e.g., a hard disk, a magnetic disk, an optical disk, a FLASH memory, a memory stick, etc.) so that the contact information may persist when the computing system is shut down. Similarly, each of a plurality of computing systems of a user may store a version of the contact store 240. The contact stores on the plurality of computing systems could be synchronized using any of a variety of techniques, including known techniques, to help ensure that updates made to one version of the contact store 240 on one computing system may be propagated to, duplicated on, etc., to another version of the contact store 240 on another computing system.

Contact Manager and Contact Manager APIs

As discussed above, applications and software modules such as the presence system 204 may access the contact store 240 via the contact manager 250. Also as discussed above, the contact manager 250 may provide a set of APIs that permit applications and software modules to read or modify information in the contact store 240. Examples of such APIs will be discussed below. It will be understood by those of ordinary skill in the art that other APIs may be used additionally and/or alternatively, and that the APIs discussed herein may be modified. Some applications or software modules may be permitted to use only some APIs. For example, it may be desirable in a particular implementation to permit only some applications or software modules to modify information in the contact store 240, and to permit other applications or software modules to only retrieve information from the contact store 240. One or more of the following example functions and/or other similar functions may be made available to applications and/ or software modules via one or more dynamic link libraries (DLLs). Alternatively, the functions may be provided using any other type of technique known to those of ordinary skill in the art.

One example is an "addcontactfromXML" function to permit adding a contact to the contact store 240 based on information in an extensible markup language (XML) format. This function may be used, for example, to import contact information from another computing system. In one implementation, the addcontactfromXML function may be passed XML data that includes an X.509 certificate and optionally other information. Then the XML data may be parsed and the X.509 certificate extracted. Next, the X.509 certificate may be parsed to extract the unique identifier of the contact and optionally other information such as an alias. Then, it may be determined if a contact having the unique identifier is already stored in the contact store 240. If a contact having the unique identifier is already stored in the contact store 240, the contact is not added an error notification may be returned. If a contact having the unique identifier is not already stored in the contact store 240, the X.509 certificate may be stored in the contact store. Default values, for example, may be stored for the indicator of whether the presence of the contact is to be monitored and the indicator of whether the presence of the contact is to be monitored. Other information in the XML data could be stored as well such as a mailing address, e-mail address, phone number, etc. In other similar functions, the contact information could be provided in a format other than XML.

Another example function is a "deletecontact" function to permit deleting a contact from the contact store 240. In one implementation, the deletecontact function may be passed the unique identifier of the contact. Then, it may be determined if a contact having the unique identifier is stored in the contact store 240. If a contact having the unique identifier is not stored in the contact store 240, an error notification may be returned. If a contact having the unique identifier is stored in the contact store 240, the X.509 certificate associated with the contact may be deleted from the contact store.

Yet another example function is an "updatecontact" function to permit modifying information in the contact store 240 associated with a contact. For example, a function such as this function could be used to change the indicator of whether the contact's presence is to be monitored and the indicator of whether the contact may monitor the user's presence. Similarly, a function such as this function could be used to change contact information such as the contact's alias, a mailing address, an e-mail address, a telephone number, a categorization of the contact, etc. In one implementation, the updatecontact function may be passed a data structure that includes the unique identifier of the contact and information that is to be updated. Then, it may be determined if a contact having the unique identifier is stored in the contact store 240. In other implementations, the function may be passed information other than the unique identifier and the contact may be located in the contact store 240 using this information. If a contact having the unique identifier is not stored in the contact store 240, an error notification may be returned. If a contact having the unique identifier is stored in the contact store 240, the information passed in the data structure may be used to update the information in the contact store 240. In this implementation, the updatecontact function cannot be used to modify the unique identifier of a contact. In other implementations, it may be possible to modify the unique identifier.

Another example function is a "getcontact" function to permit retrieving information associated with a contact from the contact store 240. This function may be used, for example, to retrieve contact information from the contact store 240. In one implementation, the function is passed the unique identifier of the contact. Then, it may be determined if a contact having the unique identifier is stored in the contact store 240. In other implementations, the function may be passed information other than the unique identifier and the contact may be located in the contact store 240 using this information. If a contact having the unique identifier is not stored in the contact store 240, an error notification may be returned. If a contact having the unique identifier is stored in the contact store 240, some or all information associated with the contact may be returned in a data structure, for example. For instance, the data may be stored in the data structure, and the function may return a pointer to the data structure. In one implementation, if the unique identifier passed to the function is a value that indicates that the user's information is desired (e.g., the unique identifier is a NULL value, the user's unique identifier, etc.), then the user's contact information (e.g., including a X.509 certificate) may be returned (i.e., a "Me" contact).

A further example function is a "getcontactXML" function to permit retrieving information associated with a contact from the contact store 240. This function may be used, for example, to export contact information to another computing system. In one implementation, the function is passed the unique identifier of the contact. Then, it may be determined if a contact having the unique identifier is stored in the contact store 240. In other implementations, the function may be passed information other than the unique identifier and the contact may be located in the contact store 240 using this information. If a contact having the unique identifier is not stored in the contact store 240, an error notification may be returned. If a contact having the unique identifier is stored in the contact store 240, some or all information associated with the contact may be stored in a string variable in an XML format. Then, the function may return the string variable or a pointer to the string variable, for example. In one implementation, if the unique identifier passed to the function is a value that indicates that the Me contact is desired (e.g., the unique identifier is a NULL value, the user's unique identifier, etc.), then the Me contact information (e.g., including a X.509 certificate) may be returned as XML formatted data.

Another example function is an "enumcontacts" function to permit obtaining an indication of the contacts stored in the contact store 240. In one implementation, when this function is called, a list of all the contacts in the contact store 240 is created. Then, an object is created that contains the list. Next, the function returns a handle to the object. This handle may then be used to retrieve the list of contacts in the contact store 240.

Yet another example function is a "getcontactfromXML" function to permit obtaining contact information from XML formatted data. This function may be used, for example, by an application or software module to display contact information received as XML formatted data prior to storing the contact information in the contact store. In one implementation, the getcontactfromXML function may be passed XML data that includes an X.509 certificate and optionally other information. Then the XML data may be parsed and the X.509 certificate extracted. Next, the X.509 certificate may be parsed to extract the unique identifier of the contact and optionally other information such as an alias. Then, the unique identifier and optionally some or all of the other information such as the alias may be stored as an object. Next, the function may return the object or a pointer to the object, for example. In other similar functions, the contact information could be provided in a format other than XML.

Other functions could be provided as well. For example, the contact manager 250 could provide a function to determine for which contacts presence is to be monitored. As another example a function could be provided to determine which contacts are allowed to monitor the presence of the user.

The contact manager 250 may notify other applications and software modules of changes related to the contact store 240. For instance, the contact manager 250 may notify one or more other applications and software modules when, for example, a new contact has been added to the contact store 240, when a contact has been deleted, when a contact has been updated, when a contact whose presence was being monitored was deleted or when an indicator of whether the presence of a contact should be monitored has been changed, when a contact who had been marked as being allowed to monitor the user's presence was deleted or when an indicator of whether the contact is allowed to monitor the presence of the user has been changed, etc. The contact manager 250 could, for example, send an indication that a particular type of event has occurred (e.g., a contact has been deleted) to multiple applications and/or software modules directly or indirectly. Then, the contact manager 250 could, for example, present more information regarding the event (e.g., the particular contact that was deleted) in an accessible location such that other applications and/or software modules that would like to obtain more information regarding the event can access the information. Alternatively, the contact manager 250 could send information to applications and/or software modules indicating that the event occurred and also providing the additional information regarding the event. For example, the contact manager 250 could send information to applications and/or software modules that had previously indicated that they would like to receive such information. One of ordinary skill in the art will recognize many other techniques in which the contact manager 250 can notify other applications and/or software modules regarding changes to the contact store 240.

Figure 3:
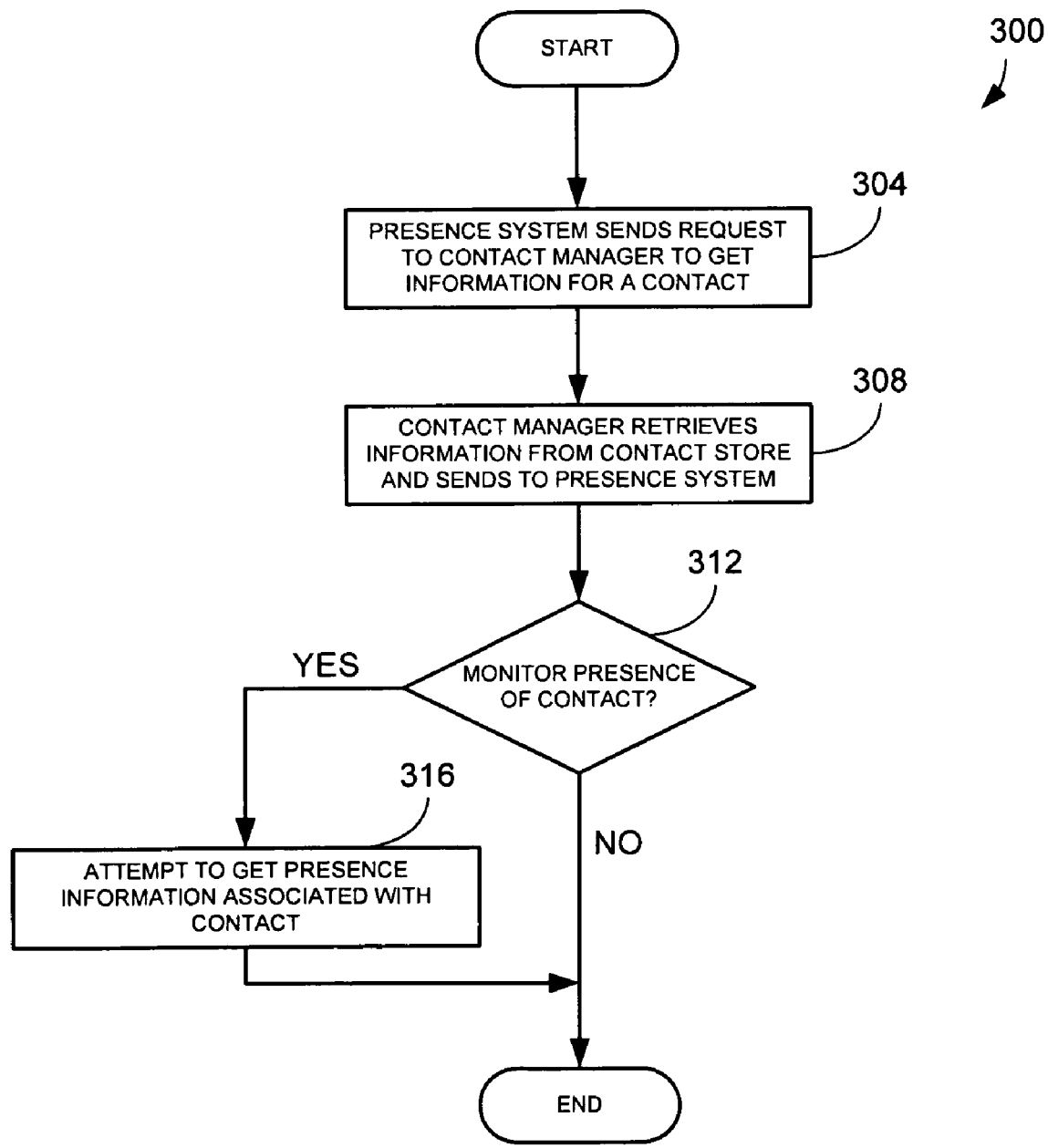
FIG. 3 is a flow diagram of an example method related to monitoring presence information of an entity.

FIG. 3 is a flow diagram of an example method 300 for determining if the presence of a contact in the contact store 240 should be monitored, and if so, getting presence information for the contact. The method 300 could be implemented by a system such as the system 200 of FIG. 2, for example, and will be described with reference to FIG. 2. At a block 304, the presence system 204 may request from the contact manager 250 information regarding a contact. For example, the presence system could utilize the "getcontact" function, or a similar technique. At a block 308, the contact manager 250 may retrieve the contact information for the specified contact from the contact store 240. The contact information may include an identifier of the contact that can be used to locate the contact on the network 202. The contact information may also include an indication of whether presence of the contact is to be monitored. Then, the requested contact information is provided to the presence manager 204.

At a block 312, it may be determined if the presence of the contact is to be monitored. For example, the contact information retrieved at the block 308 may include an indicator of whether presence of the contact is to be monitored, and this indicator may be examined to determine if presence of the contact is to be monitored. As another example, the contact information retrieved at the block 308 may include an indication of a category of which the contact is a member. In some implementations, determining if presence is to be monitored may comprise determining if presence of contacts in the category indicated by the contact information is to be monitored. For example, a user may choose to monitor the presence of all contacts in a "Friends" category.

If it is determined that presence of the contact is to be monitored, the presence system 204 may attempt to get presence information for the contact at a block 316. If it is determined that presence of the contact is not to be monitored, the flow may end.

Figure 4:
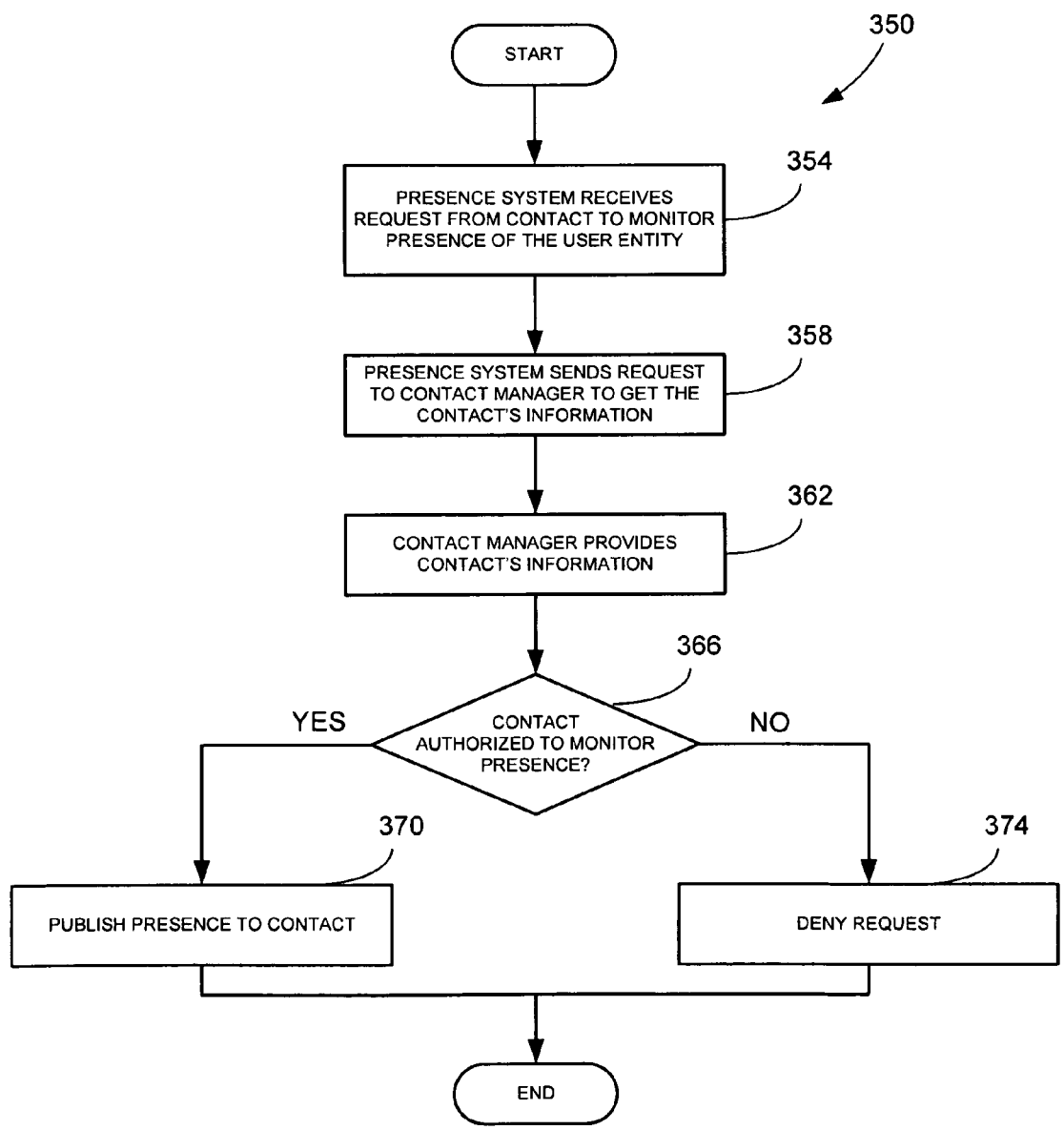
FIG. 4 is a flow diagram of an example method related to permitting an entity to monitor presence of a user.

FIG. 4 is a flow diagram of an example method 350 for determining if a contact is authorized to monitor presence of a user entity, and if so, providing presence information to the contact. The method 350 could be implemented by a system such as the system 200 of FIG. 2, for example, and will be described with reference to FIG. 2. At a block 354, the presence system 204 may receive, via the network 202, a request from a contact to monitor the presence of the user entity. The request may include an authenticated identifier of the contact, for example. At a block 358, the presence system 204 may send a request to the contact manager 250 for information regarding a contact. For example, the presence system could utilize the "getcontact" function, or a similar technique.

At a block 362, the contact manager 250 may retrieve the contact information for the specified contact from the contact store 240. The contact information may include an indication of whether the contact is authorized to monitor presence of the user entity. Then, the requested contact information is provided to the presence manager 204.

At a block 366, it may be determined if the contact is authorized to monitor presence of the user entity. For example, the contact information provided at the block 362 may include an indicator of the contact is authorized to monitor presence of the user entity, and this indicator may be examined to determine if the contact is authorized to monitor presence of the user entity. As another example, the contact information retrieved at the block 362 may include an indication of a category of which the contact is a member. In some implementations, determining if the contact is authorized to monitor presence of the user entity may comprise determining if contacts in the category indicated by the contact information authorized to monitor presence of the user entity. For example, a user may choose to authorize contacts in a "Friends" category to monitor presence of the user.

If it is determined that the contact is authorized to monitor presence of the user entity, the presence system 204 may attempt to send presence information to the contact via the network 202 at a block 370. If it is determined that the contact is not authorized to monitor presence of the user entity, a denial may be sent to the contact via the network 202 at a block 374.

Presence System

As discussed above, the presence system 204 may monitor the presence of other entities on the communication network 202 and may publish the presence of the user to other entities. Additionally, the presence system 204 may monitor capabilities and/or objects of other entities, and may publish capabilities and/or objects of the user. Also as described above, the presence system 204 may store presence information, capability information, and/or objects information regarding the user entity and other entities in the presence store 208, the capabilities store 212, and the objects store 216, respectively.

In some implementations, an entity may have multiple endpoints associated with it (e.g., a computer at home, a computer at work, a PDA, etc.). In these implementations, the presence system 204 may comprise an endpoint manager that may determine one or more endpoints associated with a contact. For each endpoint of a contact, the presence system 204 may store information such as an address and/or a port number, for example, to enable establishing a connection and communication with the endpoint and, optionally, a human readable name of the endpoint (e.g., "Home," "Work," "PDA," etc.). If an address and/or a port number, for example, of an endpoint changes, the presence system 204 may detect such a change and update its information regarding the contact.

The presence system 204 may provide APIs that permit applications and software modules to read or modify information associated with endpoints. One example function is an "enumendpoints" function to permit obtaining information regarding the endpoints of a contact. In one implementation, the enumendpoints function may be passed an indication of the contact (e.g., a unique identifier) for which endpoint information is desired. Then the endpoints associated with the contact may be assembled into an array, for example. Next, the function may return a pointer or handle to the array, for example.

Another example function is a "getendpointname" function to return a human readable name of the endpoint associated with the computing system on which the presence system is being implemented. For example, the function may return the human readable name, a pointer to the human readable name, or some other indicator of the endpoint. As discussed above, a particular computing system may have multiple endpoints associated with it. For example, separate applications running on the computing system may be considered separate endpoints. As another example, two or more users could use the same computing system, thus the computing system may have multiple endpoints associated with it corresponding to different login accounts, for example. Thus, in some implementations, the getendpointname function optionally may be passed an argument that indicates the particular endpoint for which a name is requested.

Yet another example function is a "setendpointname" function to set a human readable name for an endpoint. The function may be passed a variable that includes text of the desired name to be assigned to the endpoint. In implementations in which a computing system may have multiple endpoints with which it is associated, the function optionally may be passed an indicator of the endpoint.

The presence system 204 may maintain a list of contacts and/or endpoints that the presence system 204 is monitoring for presence information. The presence system 204 may provide an API to permit applications and software modules to get information regarding the contacts and/or endpoints that the presence system 204 is monitoring. As an example, a "getaddresses" function may enable applications and software modules to obtain the list of contacts and/or endpoints maintained by the presence system 204. The function may return an array containing a list of contacts or endpoints, a pointer to the array, a handle, etc., and may also return a number of endpoints/contacts in the array.

Another example function is a "getpresenceinfo" function to get presence information for a contact. In one implementation, the getpresenceinfo function may be passed an indication of the contact (e.g., a unique identifier) for which presence information is to be retrieved. Optionally, the function may also be passed an indication of an endpoint of the contact for which presence information is to be retrieved. In response, the presence system 204 may attempt to retrieve presence information regarding the contact. For example, the presence system 204 could utilize the communication module 260 to establish a connection with one or more computing systems associated with the contact, and then retrieve presence information from the computing system(s). If presence at a particular endpoint is desired, the presence system 204 could utilize the communication module 260 to establish a connection with a computing system associated with the endpoint, and then obtain presence information from the computing system. As another example, the presence system 204 could first attempt to retrieve presence information from the presence store 208. If presence information for the contact is in the presence store 208, the presence system 204 could return that presence information rather than retrieving presence information from a computing system (or systems) associated with the contact. If the presence system 204 is unable to obtain presence information for the contact (e.g., cannot obtain presence information from a computing system of the contact), the getpresenceinfo function may return an indication that the presence system 204 was unable to obtain presence information for the contact.

In implementations in which the presence system 204 may determine respective presence information at a plurality of endpoints associated with a contact, the presence system 204 may generate aggregated presence information for the contact. For example, if the presence system 204 determines presence for one endpoint of a contact is "online" and that presence for the remaining endpoints of the contact is "offline," the presence system 204 may determine the aggregated presence information for the contact is "online." After receiving the aggregated presence of the contact, an application or software module could then utilize a function such as the getpresenceinfo function to determine presence at particular endpoints of the contact. Generate aggregated presence information for a contact based on presence information corresponding to a plurality of endpoints of the contact could implemented using any of a variety of techniques. As just one example, presence states could be prioritized, and the aggregated presence information could be set to the presence state having the highest priority in the plurality of presence states corresponding to endpoints of the contact.

Still another example function is an "enumcapabilities" function to get capability information for a contact. In one implementation, the enumcapabilities function may be passed an indication of the contact (e.g., a unique identifier) for which capability information is to be retrieved. Optionally, the function may also be passed an indication of an endpoint of the contact for which capability information is to be retrieved. In response, the presence system 204 may attempt to retrieve capability information regarding the contact. For example, the presence system 204 could utilize the communication module 260 to establish a connection with one or more computing systems associated with the contact, and then retrieve capability information from the computing system(s). If capabilities at a particular endpoint are desired, the presence system 204 could utilize the communication module 260 to establish a connection with a computing system associated with the endpoint, and then obtain capability information from the computing system. As another example, the presence system 204 could first attempt to retrieve capability information from the capabilities store 212. If capability information for the contact is in the capabilities store 212, the presence system 204 could return that capability information rather than retrieving capability information from a computing system (or systems) associated with the contact. If the presence system 204 is unable to obtain capability information for the contact (e.g., cannot obtain capability information from a computing system of the contact), the enumcapabilities function may return an indication that the presence system 204 was unable to obtain capability information for the contact. If the presence system 204 is able to obtain capability information for the contact, the enumcapabilities function may return an array that lists the capabilities, a pointer to the array, a handle to the array, etc.

Capabilities of a contact could be identified using a variety of techniques. In one implementation, capabilities could be identified using a unique identifier, such as a globally unique identifier (GUID). In this implementation, the enumcapabilities function could return a list of GUIDs corresponding to the capabilities of a contact. Additionally or alternatively, other information associated with capabilities could be stored in the capabilities store 212 (e.g., a descriptive name, version identifier, etc.). The enumcapabilities function could return some or all (or none) of this other information as well.

In one implementation, the enumcapabilities function may also be passed an indication of a particular capability. For example, the function could be passed a GUID corresponding to the capability. In this implementation, the enumcapabilities function may return an indication of whether the contact has the specified capability.

Yet another example function is an "enumobjects" function to get objects information for a contact. In one implementation, the enumobjects function may be passed an indication of the contact (e.g., a unique identifier) for which object information is to be retrieved. Optionally, the function may also be passed an indication of an endpoint of the contact for which object information is to be retrieved. In response, the presence system 204 may attempt to retrieve object information regarding the contact. For example, the presence system 204 could utilize the communication module 260 to establish a connection with one or more computing systems associated with the contact, and then retrieve object information from the computing system(s). If objects at a particular endpoint are desired, the presence system 204 could utilize the communication module 260 to establish a connection with a computing system associated with the endpoint, and then obtain object information from the computing system. As another example, the presence system 204 could first attempt to retrieve object information from the objects store 216. If object information for the contact is in the objects store 212, the presence system 204 could return that object information rather than retrieving object information from a computing system (or systems) associated with the contact. If the presence system 204 is unable to obtain object information for the contact (e.g., cannot obtain object information from a computing system of the contact), the enumobjects function may return an indication that the presence system 204 was unable to obtain object information for the contact. If the presence system 204 is able to obtain object information for the contact, the enumobjects function may return an array that lists the objects, a pointer to the array, a handle to the array, etc.

Objects of a contact could be identified using a variety of techniques. In one implementation, objects could be identified using a unique identifier, such as a GUID. In this implementation, the enumobjects function could return a list of GUIDs corresponding to the objects of a contact. Additionally or alternatively, other information associated with objects could be obtained from other user entities and/or stored in the objects store 216 (e.g., a descriptive name). The enumobjects function could return some or all (or none) of this other information as well.

In one implementation, the enumobjects function may also be passed an indication of a particular object. For example, the function could be passed a GUID, an object name, etc., corresponding to the object. In this implementation, the enumobjects function may return an indication of whether the contact has the specified object.

Another example function is a "setpresenceinfo" function to set the presence of the user. In implementations in which a contact may only have one endpoint with which it is associated, this function may be used to set the presence for the user entity. In implementations in which a contact may have multiple endpoints with which it is associated, this function may be used to set the presence for the user entity for a particular endpoint (e.g., the computing system on which the presence system 204 is being implemented). The function may be passed an indication of a presence value. In response, the presence system 204 may set the presence of the user entity or endpoint to that value. Afterwards, if the presence of the user entity or endpoint is published to other contacts, it will reflect the new presence value.

Another example function is a "setobject" function to publish an object of the user. In implementations in which a contact may only have one endpoint with which it is associated, this function may be used to publish an object associated with the user entity. In implementations in which a contact may have multiple endpoints with which it is associated, this function may be used to publish an object associated with a particular endpoint (e.g., the computing system on which the presence system 204 is being implemented). The function may be passed an indication of the object (e.g., a GUID, an object name, etc.). In response, the presence system 204 may determine if an object corresponding to the indication passed with the function has already been published. For example, the presence system 204 may examine the objects store 216 for an indication of the object. If it has not been published, the presence system may store the object or an indication of the object in the objects store 216, and may publish the object to those contacts authorized to monitor the user entity, those authorized and who have requested object information of the user entity, etc. If it has been published, the presence system may store an updated version of the object or an indication of the updated object in the objects store 216, and may publish the updated object to those contacts authorized to monitor the user entity, those authorized and who have requested object information of the user entity, etc.

Yet another example function is a "deleteobject" function to stop publishing an object of the user. The function may be passed an indication of the object (e.g., a GUID). In response, the presence system 204 may delete the object or an indication of the object from the objects store 216. Afterwards, the presence system 204 will no longer publish the object to other contacts.

Similar functions to the setobject function and the deleteobject function may be used to publish and unpublish capabilities of a user entity and/or an endpoint of the user entity. With these functions, capabilities and/or indications of capabilities may be added, updated, and/or deleted from the capabilities store 212.

The presence system 204 may notify other applications and software modules of changes related to presence, capabilities, objects, publishing presence, and monitoring others' presence. For instance, the presence system 204 may notify one or more other applications and software modules when, for example, presence status of a contact/endpoint currently being monitored has changed, when a written description of an endpoint has changed (e.g., "Home PC" changed to "Xbox"), when presence information about a new endpoint is available, when presence information regarding an endpoint is no longer available, etc. Also, the presence system 204 may notify one or more other applications and software modules when, for example, an indicator of whether a contact's presence should be monitored has been changed, an indicator of whether a contact is authorized to monitor the user's presence has changed, a contact whose presence was being monitored was deleted from the contact store 240, a contact authorized to monitor the user's presence was deleted from the contact store, etc.

Additionally, the presence system 204 may notify one or more other applications and software modules when, for example, an object of the user or an object of a contact that is being monitored has been changed (e.g., added, deleted, or updated). Similarly, the presence system 204 may notify one or more other applications and software modules when, for example, a capability of the user or a capability of a contact that is being monitored has been changed (e.g., added or deleted). Further, the presence system 204 may notify one or more other applications and software modules when, for example, a contact has requested to monitor the presence of the user and such a request from the contact was not previously denied and the contact has not been marked as not authorized to monitor presence of the user in the contact store 240.

The presence system 204 and/or the contact manager 250 may notify other applications and software modules of changes related to the contact store 240. For instance, the presence system 204 and/or the contact manager 250 may notify one or more other applications and software modules when, for example, when information in the contact store 240 regarding a contact has been modified, when a contact has been added to the contact store 240, when a contact has been deleted from the contact store 240, etc.

The presence system 204 and/or the contact manager 250 could, for example, send an indication that a particular type of event has occurred (e.g., presence of a new contact is to be monitored) to multiple applications and/or software modules directly or indirectly. Then, the presence system 204 could, for example, present more information regarding the event (e.g., the particular contact whose presence is to be monitored) in an accessible location such that other applications and/or software modules that would like to obtain more information regarding the event can access the information. Alternatively, the presence system 204 could send information to applications and/or software modules indicating that the event occurred and also providing the additional information regarding the event. For example, the presence system 204 could send information to applications and/or software modules that had previously indicated that they would like to receive such information. If the contact manager 250 is to notify other applications and software modules of changes related to the contact store 240, it could utilize similar techniques. One of ordinary skill in the art will recognize many other techniques in which the presence system 204 and/or the contact manager 250 can notify other applications and/or software modules regarding events such as those described above.

Figure 5:
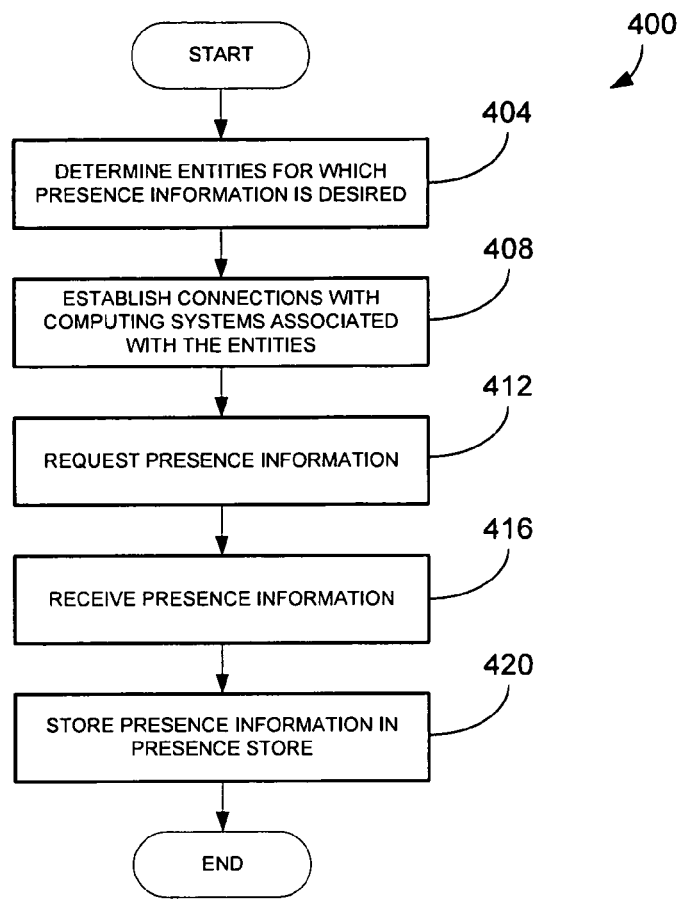
FIG. 5 is a flow diagram of an example method related to monitoring presence information of one or more entities.

FIG. 5 is a flow diagram of an example method 400 for retrieving presence information of one or more contacts. The method 400 could be implemented by a system such as the system 200 of FIG. 2, for example, and will be described with reference to FIG. 2. At a block 404, entities for which presence information is desired are determined. Determining entities for which presence information is desired may comprise, for example, examining information in the contact store 240 via the contact manager 250, for example. Determining entities for which presence information is desired may also comprise, for example, examining a list of contacts and/or endpoints for which presence information is desired.

At a block 408, connections with computer systems associated with the entities determined at the block 404 may be established. For example, the presence system 204 could utilize the communication module 260 to establish connections with appropriate computing systems. Establishing connections may comprise determining one or more endpoints associated with an entity. Then, at a block 412, presence information may be requested from the computing systems with which connections were established. For example, the computing systems could be implementing systems the same as or similar to the system 200 of FIG. 2, and thus could provide requested presence information. At a block 416, the presence information requested at the block 412 may be received by the system 200. Then, the presence information may be stored in the presence store 208.

At least some of the blocks 404, 408, 412, 416, and 420 may be repeated periodically (e.g., ever 5 minutes or at a rate that is suitable for a particular implementation). In this way, a contact that went "offline" but did not announce it was doing so may be detected. Additionally or alternatively, at least some of the blocks 404, 408, 412, 416, and 420 may be repeated upon an occurrence of an event, such as the addition of a contact for which presence is to be monitored.

Figure 6:
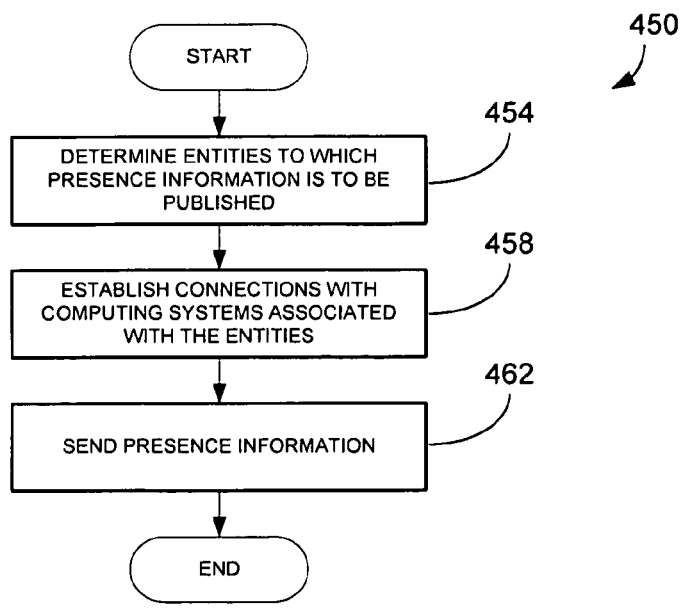
FIG. 6 is a flow diagram of an example method related to providing presence information to one or more entities.

FIG. 6 is a flow diagram of an example method 450 for publishing presence information to one or more contacts. The method 450 could be implemented by a system such as the system 200 of FIG. 2, for example, and will be described with reference to FIG. 2. At a block 454, entities to which presence information is to be published are determined. Determining entities to which presence information is to be published may comprise, for example, examining information in the contact store 240 via the contact manager 250, for example. Determining entities to which presence information is to be published may also comprise, for example, examining a list of contacts and/or endpoints to which presence information is to be published.

At a block 458, connections with computer systems associated with the entities determined at the block 454 may be established. For example, the presence system 204 could utilize the communication module 260 to establish connections with appropriate computing systems. Establishing connections may comprise determining one or more endpoints associated with an entity. Then, at a block 462, presence information may be sent to the computing systems with which connections were established.

At least some of the blocks 454, 458, and 462 may be repeated periodically (e.g., ever 5 minutes or at a rate that is suitable for a particular implementation). Additionally or alternatively, at least some of the blocks 454, 458, and 462 may be repeated upon an occurrence of an event, such as the addition of a contact to which presence is to be provided.

Referring now to FIGS. 5 and 6, the method 400 may be used to monitor the presence of a first set of entities, and the method 500 may be used to publish presence information regarding the user to a second set of entities. As will be understood by those of ordinary skill in the art, the first set of entities may be different than the second set of entities because the system 200 permits a user to separately select the first and second sets. For instance, in the implementation described above, the user can separately select for each contact in the contact store 240 whether to authorize the contact to monitor the presence of the user and whether the presence of the contact should be monitored. As another example, the user could separately select whether a category of contacts is authorized to monitor the presence of the user, and whether presence information for the category of contacts should be monitored.

Figure 7:
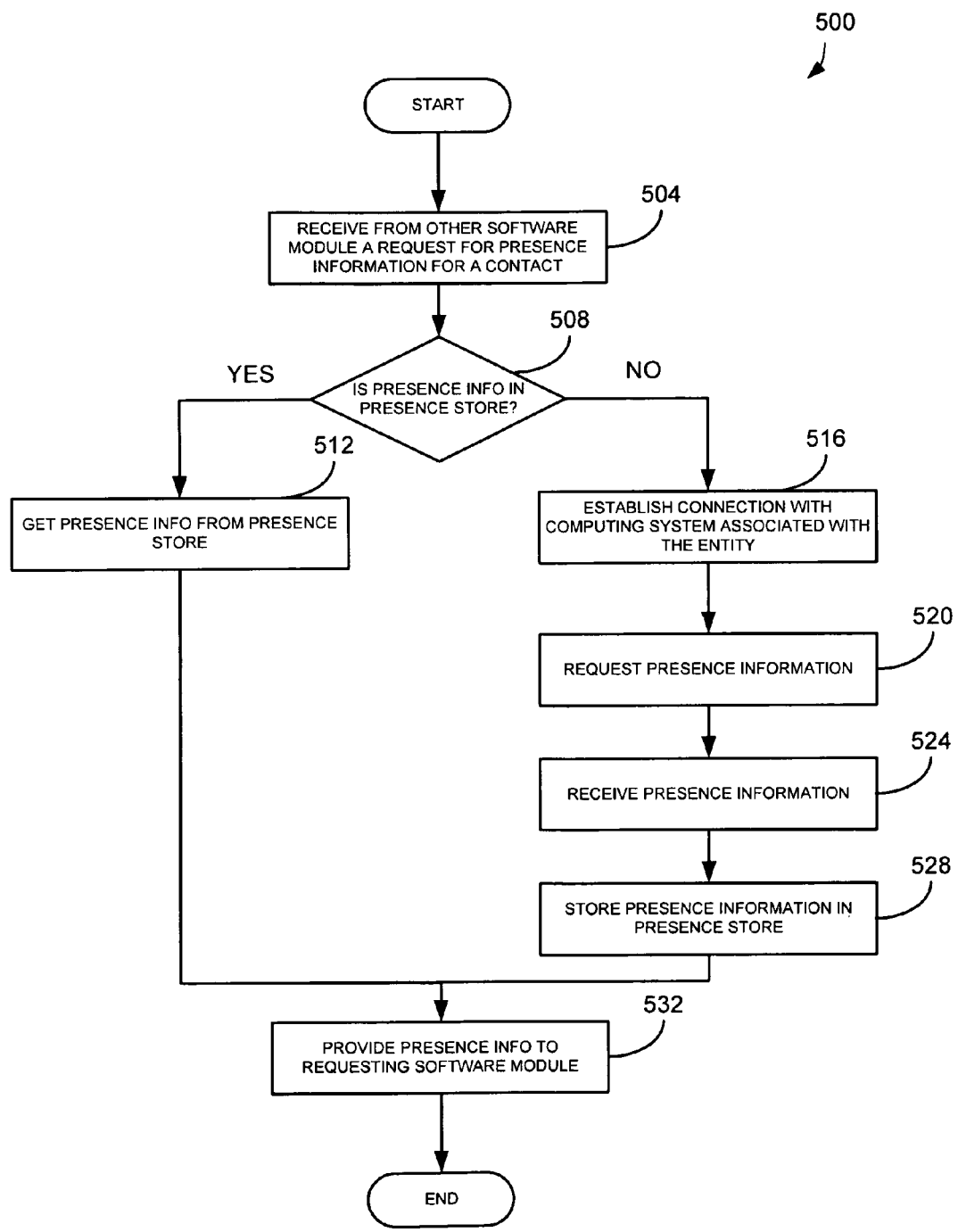
FIG. 7 is a flow diagram of an example method related to providing presence information regarding an entity.

FIG. 7 is a flow diagram of an example method 500 for getting presence information of a contact in response to a request from an application or other software module. The method 500 could be implemented by a system such as the system 200 of FIG. 2, for example, and will be described with reference to FIG. 2. At a block 504, the presence system 200 may receive a request from an application or software module for presence information for a contact. At a block 508, it may be determined if presence information corresponding to the contact is in the presence store 208. If presence information corresponding to the contact is in the presence store 208, then the presence information may be retrieved from the presence store 208 at a block 512.

If presence information corresponding to the contact is not in the presence store 208, the flow may proceed to a block 516. At the block 516, a connection with one or more computing systems corresponding to the contact may be established. For example, the presence system 204 could utilize the communication module 260 to establish a connection with the computing system(s). Establishing connections may comprise determining one or more endpoints associated with the contact.

At a block 520, presence information may be requested from the computing systems with which connections were established. For example, the computing systems could be implementing systems the same as or similar to the system 200 of FIG. 2, and thus could provide requested presence information. At a block 524, the presence information requested at the block 520 may be received by the system 200. Optionally, the presence information may be stored in the presence store 208 at a block 528. Next, at a block 532, the presence information received at the block 524 is provided to the application or software module that requested the presence information at the block 504.

Optionally, the contact and/or endpoints associated with the contact may be added to a list of contacts and/or endpoints of which presence information is to be retrieved, for example. Then, a method the same as or similar to the method 400 of FIG. 5 could be used to monitor the presence of the contact.

Figure 8:
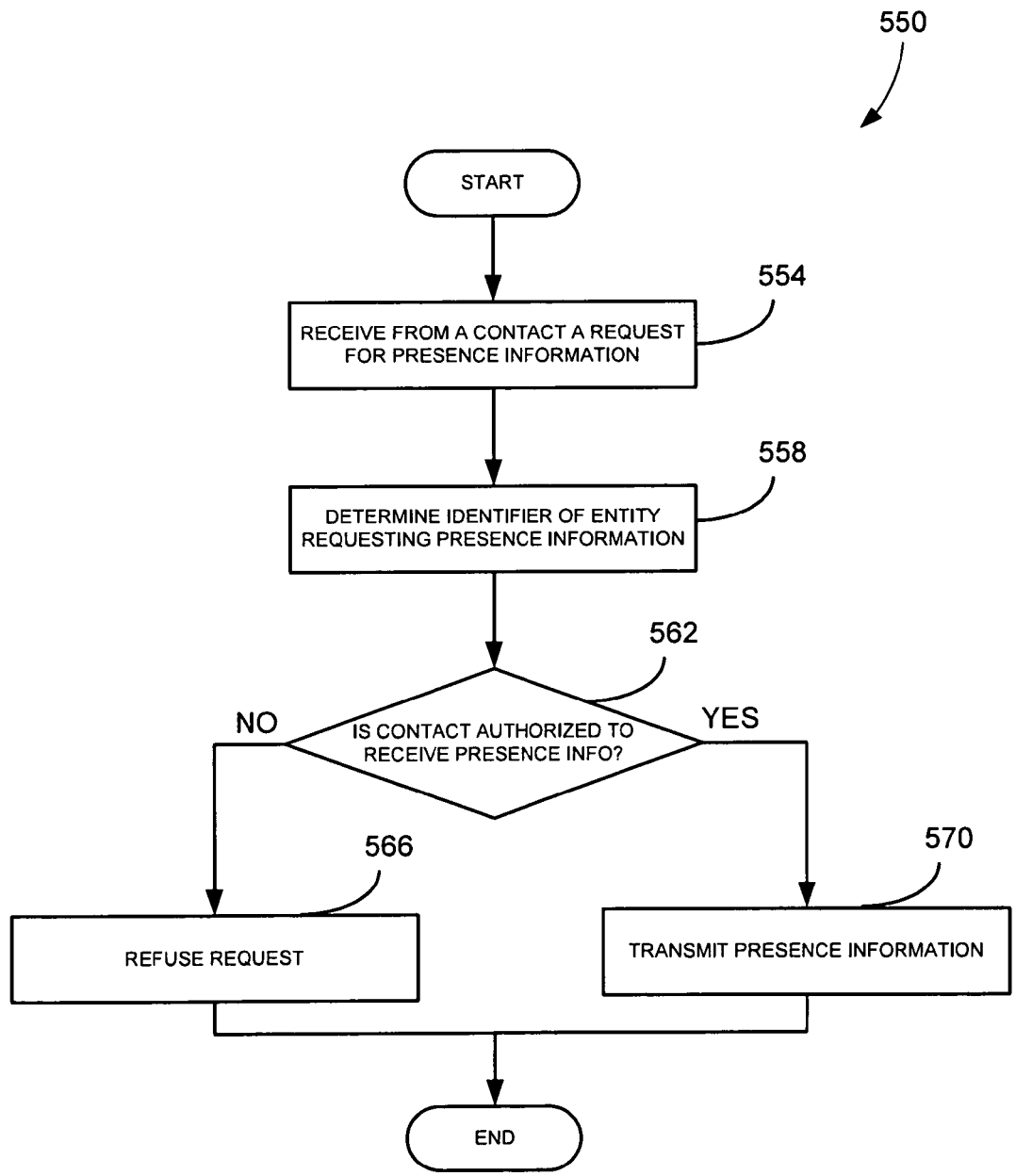
FIG. 8 is a flow diagram of an example method related to providing presence information regarding a user to another entity.

FIG. 8 is a flow diagram of an example method 550 for publishing presence information to a contact in response to a request from the contact. The method 550 could be implemented by a system such as the system 200 of FIG. 2, for example, and will be described with reference to FIG. 2. At a block 554, a request for presence information may be received from a contact. For example, a computing system associated with a contact could implement a system the same as or similar to the system 200 of FIG. 2, and thus could send requests for presence information to a computing system of the user.

At a block 558, an identifier of the entity requesting the presence information may be determined. For example, an X.509 certificate or the like of the entity obtained while establishing a connection with the entity may be analyzed to determine a unique identifier of the entity. Optionally, an endpoint of the contact may also be determined. For example, the endpoint that issued the request received at the block 554 may be identified.

At a block 562, the identifier determined at the block 558 may be used to determine if the entity is authorized to receive presence information. For example, the identifier determined at the block 558 may be used to retrieve information in the contact store 240 regarding the contact. For instance, information in the contact store 240 could be obtained via the contact manager 250. As another example, a list of contacts and/or endpoints to which presence information is to be published could be examined to determine if the contact and/or an endpoint associated with the contact is in this list. It may be assumed, for instance, that contacts/endpoints in the list are authorized to receive presence information.

If it is determined that the contact/endpoint is not authorized to receive presence information, then at a block 566, the request received at the block 554 may be denied. On the other hand, if it is determined that the contact/endpoint is authorized to receive presence information, then at a block 570, the presence information may be transmitted to the entity. Transmitting the presence information may comprise utilizing the communication module 260 to establish a connection or connections, if not currently established, with appropriate computing systems. Establishing connections may comprise determining one or more endpoints associated with an entity.

Optionally, the contact and/or endpoints associated with the contact may be added to a list of contacts and/or endpoints to which presence information is to be transmitted, for example. Then, a method the same as or similar to the method 450 of FIG. 6 could be used to publish to the contact the presence information.

With regard to capabilities, methods similar to the method 400 of FIG. 5 and the method 500 of FIG. 7 could be used to obtain capabilities of one or more contacts. Also, methods similar to the method 450 of FIG. 6 and the method 550 of FIG. 8 could be used to publish capabilities of the user to one or more contacts. With regard to objects, methods similar to the method 400 of FIG. 5 and the method 500 of FIG. 7 could be used to obtain objects of one or more contacts. Also, methods similar to the method 450 of FIG. 6 and the method 550 of FIG. 8 could be used to publish objects of the user to one or more contacts.

Referring again to FIG. 2, the system 200 or some other system may additionally interface with server-based systems to monitor others' presence, publish an entity's presence, monitor capabilities, etc., via the server-based system. For example, the contact store 240 could include contacts whose presence may be monitored via a server-based system, as well as peer-to-peer contacts. Similarly, the presence store 208, the capabilities store 212 and/or the objects store 216 could include information regarding contacts that was obtained via a server-based system.

Many modifications and variations may be made in the techniques and structures described and illustrated herein without departing from the spirit and scope of the present claims. Accordingly, it should be understood that the methods and apparatus described herein are illustrative only and are not limiting upon the scope of the claims.

The invention claimed is:

1. A method for managing contact information for use in a peer-to-peer system, the method comprising, at one or more peer computing systems associated with a user entity:

determining one or more endpoints of each of a plurality of other entities; storing, in a presence store on the one or more peer computing systems associated with the user entity, presence information associated with each of the plurality of other entities, the presence information including a human readable alias of the one or more endpoints and at least one of an address or a port number of the one or more endpoints;

providing a set of presence application program interfaces (APIs) to access the stored presence information, the set of presence application program interfaces including:

a get endpoint information API, a get name API, a set name API, a get addresses API, and a get presence information API;

storing, in a capabilities store on the one or more computing systems associated with the user entity, capabilities information associated with each of the plurality of other entities, providing a set of capabilities APIs to access the stored capabilities information, the set of capabilities APIs including a get capabilities API;

storing, in an objects store on the one or more computing systems associated with the user entity, objects information associated with each of the plurality of other entities providing a set of objects APIs to access the stored objects information, the set of objects APIs including a get objects API;

publishing at least a portion of the presence information, at least a portion of the capabilities information, and at least a portion of the objects information associated with at least one of the plurality of other entities; and storing, in a contact store on the one or more computing systems associated with the user entity, contact information associated with each of the plurality of other entities, the contact information including:

a secure unique identifier for each of the plurality of other entities, a human readable alias for each of the plurality of other entities, and an indication of at least one property of each of the plurality of other entities, including at least one of an indication of an authorization of the user entity to monitor the at least one property of each of the plurality of other entities or an indication of an authorization of each of the plurality of other entities to monitor at least one property of the user entity, the at least one property being selected from a presence property, a capabilities property, or an objects property; and providing a set of contacts application program interfaces (APIs) to access the stored contact information, the set of contacts APIs including: an add contact API, a delete contact API, an update contact API, a get contact API, an export contact API, and an enumerate contacts API.

2. The method according to claim 1, further comprising generating aggregated presence information for each of the plurality of other entities based on the presence information of all of the one or more endpoints associated with each of the plurality of other entities.

3. The method according to claim 2, wherein the aggregated presence information comprises presence information of an endpoint of each of the plurality of other entities that has a higher presence state than a presence state of any other endpoint of the each of the plurality of other entities.

4. The method according to claim 1, further comprising enabling the get presence information API to determine the presence information of a particular endpoint of each of the plurality of other entities.

5. The method according to claim 1, further comprising detecting a change to the presence information associated with one of the plurality of other entities and updating corresponding presence information in the presence store.

6. A peer computing system comprising:

a presence system at a computing device corresponding to a user entity, wherein the presence system:

is enabled to monitor a presence, a capability and an object associated with one or more other entities;

is communicatively coupled to each of: a presence store including presence information corresponding to the presence of the one or more other entities, a capabilities store including capabilities information corresponding to the capability associated with the one or more other entities, and an objects store including objects information corresponding to the object associated with the one or more other entities; and includes:

a set of presence application program interfaces (APIs) to access the presence information, the set of presence APIs including: a get endpoint information API, a get name API, a set name API, a get addresses API, and a get presence information API;

a set of capabilities APIs including capabilities information to access the capabilities information, the set of capabilities APIs including a get capabilities API; and a set of objects APIs to access the objects information, the set of objects APIs including: a get objects API, a publish objects API, and a delete objects API;

a contact manager communicatively coupled to the presence system and to a contact store, the contact store being enabled to store contact information for each of the one or more other entities, and the contact information including:

a secure unique identifier for each of the one or more other entities, a human readable alias for each of the one or more other entities, an indication of at least one property of each of the one or more other entities, including at least one of an indication of an authorization of the user entity to monitor the at least one property of each of the one or more other entities or an indication of an authorization of each of the one or more other entities to monitor at least one property of the user entity, the at least one property being selected from a presence property, a capabilities property, or an objects property, and a set of contact APIs for accessing the contact store, including an add contact API, a delete contact API, an update contact API, a get contact API, an export contact API, and an enumerate contacts API; and a communications module that is communicatively coupled to each of the one or more other entities.

7. The peer computing system of claim 6, wherein:

the presence information of a first other entity of the one or more other entities includes a presence state of the first other entity corresponding to an ability of the first other entity to communicate with a second other entity;

the capability information of the first other entity includes at least one of:

an indication of a capability of a configuration of a computing system of the first other entity to execute a particular software application, an indication of a presence of a particular hardware component on the computing system of the first other entity, or a real-time capability of the first other entity with respect to a currently executing software application; and the objects information of the first other entity includes at least one of: a data object, a file, a structure, a picture, a sound, a description, a meta-data, a name-value pair, information specific to the currently executing software application, or real-time information.

8. The method according to claim 1, further comprising at least one of:

modifying, via the add contact API, the contact store to add contact information for a new other entity;

modifying, via the delete contact API, the contact store to delete existing contact information corresponding to a first existing other entity in the plurality of other entities;

modifying, via the update contact API, the contact store to modify contact information corresponding to a second existing other entity in the plurality of other entities;

retrieving, via the get contact API, at least a portion of the contact information from the contact store corresponding to a third existing other entity in the plurality of other entities;

exporting, via the export contact API in an XML format, at least a portion of the contact information corresponding to a fourth existing other entity in the plurality of other entities; or retrieving, via the enumerate contacts API, an indication of all other entities for which contact information is stored in the contact store.

9. The method according to claim 8, further comprising generating an indication of a modification of the contact store in response to at least one of modifying the contact store to add the contact information for the new other entity, modifying the contact store to delete the existing contact information corresponding to the first existing other entity, or modifying the contact store to modify the contact information corresponding to the second existing other entity.

10. The method according to claim 9, further comprising presenting additional information corresponding to the modification of the contact store.

11. The method according to claim 8, wherein modifying the contact store to modify contact information comprises modifying the contact store to modify at least one of a particular human readable alias, a mailing address, an e-mail address, a telephone number, a categorization, or a particular secure unique identifier.

12. The method according to claim 1, further comprising:

receiving information associated with a new other entity in an extensible markup language;

parsing the information associated with the new other entity; and storing the parsed information in the contact store.

13. The method according to claim 1, further comprising storing, in the contact store, contact information associated with the user entity.

14. The method according to claim 1, further comprising storing the contact information on at least two peer computing systems associated with the user entity.

15. The method according to claim 1, further comprising storing, in the contact store, contact information of at least one other entity corresponding to a computing device of a server-based network.

16. The method according to claim 1, further comprising permitting an application to use only a subset of the set of contacts APIs.

17. The method according to claim 1, wherein providing the set of contacts APIs comprises providing the set of contacts APIs via one or more dynamic link libraries (DLLs).

18. The method according to claim 1, wherein storing, in the contact store, the secure unique identifier comprises storing, in the contact store, a unique identifier secured by one of a third-party or a self-signed X.509 certificate.

19. The method according to claim 1, wherein storing, in the contact store, the contact information comprises storing, in the contact store, the contact information in a string variable in an XML format.

20. The method of claim 1, wherein:

the presence information further includes a presence state of the one or more endpoints corresponding to an ability of the one or more endpoints to communicate with another entity;

the capabilities information includes at least one of: an indication of a capability of a configuration of a computing system of each of the plurality of other entities to execute a particular software application, an indication of a presence of a particular hardware component on the computing system of each of the plurality of other entities, or a real-time capability of each of the plurality of other entities with respect to a currently executing software application; and the objects information includes at least one of: a data object, a file, a structure, a picture, a sound, a description, a meta-data, a name-value pair, information specific to the currently executing software application, or real-time information.

* * * * *